US011564344B2

(12) United States Patent
Johnson et al.

(10) Patent No.: US 11,564,344 B2
(45) Date of Patent: Jan. 31, 2023

(54) PARTICLE DELIVERY SYSTEM OF AN AGRICULTURAL ROW UNIT

(71) Applicant: CNH Industrial America LLC, New Holland, PA (US)

(72) Inventors: Chad Michael Johnson, Arlington Heights, IL (US); Brian John Anderson, Yorkville, IL (US); Trevor Philip Stanhope, Oak Lawn, IL (US); Christopher Schoeny, Minooka, IL (US); Kregg Jerome Raducha, Oak Park, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 472 days.

(21) Appl. No.: 16/726,648

(22) Filed: Dec. 24, 2019

(65) Prior Publication Data
US 2021/0185890 A1    Jun. 24, 2021

(51) Int. Cl.
*A01C 7/04*    (2006.01)
*A01C 7/10*    (2006.01)

(52) U.S. Cl.
CPC ............. *A01C 7/046* (2013.01); *A01C 7/102* (2013.01)

(58) Field of Classification Search
CPC ......... A01C 7/046; A01C 7/102; A01C 7/044; A01C 7/042; A01C 7/04; A01C 7/00; A01C 7/10
See application file for complete search history.

(56) References Cited

U.S. PATENT DOCUMENTS 222,042 A   11/1879  Haworth
285,413 A    9/1883  Johnson
(Continued)

FOREIGN PATENT DOCUMENTS

AU      2012201380 A1    3/2012
BR    122012026494 B1    4/2016
(Continued)

OTHER PUBLICATIONS

Precision Planting, PrecisionMeter A Better Finger Meter, Improve Planter Performance Where it Counts—In the Meter, https://precisionplanting.com/products/product/precisionmeter, Feb. 14, 2019, 8 pages.
(Continued)

*Primary Examiner* — Christopher J. Novosad
(74) *Attorney, Agent, or Firm* — Rebecca Henkel; Rickard DeMille

(57) ABSTRACT

A particle delivery system of an agricultural row unit includes a first particle disc configured to meter particles and a second particle disc configured to receive the particles from the first particle disc and to transfer the particles toward a trench in soil. The particle delivery system includes a vacuum source configured to reduce air pressure within a first vacuum passage to couple the particles to one or more first apertures of the first particle disc. The vacuum source is also configured to reduce air pressure within a second vacuum passage to couple the particles to one or more second apertures of the second particle disc. A rotation rate of the first particle disc is controllable to establish a particle spacing between the particles within the trench. A rotation rate of the second particle disc is controllable to expel the particles at a particle exit speed.

20 Claims, 10 Drawing Sheets

(56) References Cited

U.S. PATENT DOCUMENTS

| | | |
|---|---|---|
| 716,408 A | 12/1902 | Graham |
| 2,646,191 A | 7/1953 | Wechsler |
| 2,852,995 A | 9/1958 | Domries |
| 3,176,636 A | 4/1965 | Wilcox et al. |
| 3,343,507 A | 9/1967 | Smith |
| 3,561,380 A | 2/1971 | Adams, Jr. et al. |
| 3,627,050 A | 12/1971 | Hansen et al. |
| 3,659,746 A | 5/1972 | Winslow |
| 3,913,603 A | 10/1975 | Becker |
| 4,023,509 A | 5/1977 | Hanson |
| 4,026,437 A | 5/1977 | Biddle |
| 4,029,235 A | 6/1977 | Grataloup |
| 4,094,444 A | 6/1978 | Willis |
| 4,600,122 A | 7/1986 | Lundie et al. |
| 4,628,841 A | 12/1986 | Powilleit |
| 4,928,607 A | 5/1990 | Luigi et al. |
| 5,231,940 A | 8/1993 | Tjeerdsma |
| 5,842,428 A | 12/1998 | Stufflebeam et al. |
| 5,938,071 A | 8/1999 | Sauder |
| 5,992,338 A | 11/1999 | Romans |
| 6,192,813 B1 | 2/2001 | Memory et al. |
| 6,237,514 B1 | 5/2001 | Romans |
| 6,269,758 B1 | 8/2001 | Sauder |
| 6,283,051 B1 | 9/2001 | Yoss |
| 6,332,413 B1 | 12/2001 | Stufflebeanm et al. |
| 6,564,729 B1 | 5/2003 | Petzoldt |
| 6,564,730 B2 | 5/2003 | Crabb et al. |
| 6,581,535 B2 | 6/2003 | Barry et al. |
| 6,615,754 B2 | 9/2003 | Unruh et al. |
| 6,644,225 B2 | 11/2003 | Keaton et al. |
| 6,681,706 B2 | 1/2004 | Sauder et al. |
| 6,748,885 B2 | 6/2004 | Sauder et al. |
| 6,752,095 B1 | 6/2004 | Rylander et al. |
| 6,827,029 B1 | 12/2004 | Wendte et al. |
| 6,863,006 B2 | 3/2005 | Sandoval et al. |
| 7,162,963 B2 | 1/2007 | Sauder et al. |
| 7,273,016 B2 | 9/2007 | Landphair et al. |
| 7,334,532 B2 | 2/2008 | Sauder et al. |
| 7,343,868 B2 | 3/2008 | Stephens et al. |
| 7,377,221 B1 | 5/2008 | Brockmeier et al. |
| 7,448,334 B2 | 11/2008 | Mariman et al. |
| 7,490,565 B2 | 2/2009 | Holly |
| 7,571,688 B1 | 8/2009 | Friestad et al. |
| 7,617,785 B2 | 11/2009 | Wendte |
| 7,631,606 B2 | 12/2009 | Sauder et al. |
| 7,631,607 B2 | 12/2009 | Vandersnick |
| 7,665,409 B2 | 2/2010 | Johnson |
| 7,669,538 B2 | 3/2010 | Memory et al. |
| 7,699,009 B2 | 4/2010 | Sauder et al. |
| 7,717,048 B2 | 5/2010 | Peterson et al. |
| 7,726,251 B1 | 6/2010 | Peterson et al. |
| 7,735,438 B2 | 6/2010 | Riewerts et al. |
| 7,775,167 B2 | 8/2010 | Stehling et al. |
| 7,918,168 B2 | 4/2011 | Garner et al. |
| 7,938,074 B2 | 5/2011 | Liu |
| 8,074,586 B2 | 12/2011 | Garner et al. |
| 8,078,367 B2 | 12/2011 | Sauder et al. |
| 8,166,896 B2 | 5/2012 | Shoup |
| 8,275,525 B2 | 9/2012 | Kowalchuk et al. |
| 8,276,529 B2 | 10/2012 | Garner et al. |
| 8,281,725 B2 | 10/2012 | Wendte et al. |
| 8,297,210 B2 | 10/2012 | Spiesberger |
| 8,365,679 B2 | 2/2013 | Landphair et al. |
| 8,418,634 B2 | 4/2013 | Shoup |
| 8,418,636 B2 | 4/2013 | Liu et al. |
| 8,448,587 B2 | 5/2013 | Kowalchuk et al. |
| 8,522,699 B2 | 9/2013 | Garner et al. |
| 8,522,889 B2 | 9/2013 | Adams et al. |
| 8,618,465 B2 | 12/2013 | Tevs et al. |
| 8,671,856 B2 | 3/2014 | Garner et al. |
| 8,677,914 B2 | 3/2014 | Stark |
| 8,746,159 B2 | 6/2014 | Garner et al. |
| 8,770,121 B2 | 7/2014 | Bragatto |
| 8,813,663 B2 | 8/2014 | Garner et al. |
| 8,825,310 B2 | 9/2014 | Kowalchuk |
| 8,825,311 B2 | 9/2014 | Kowalchuk |
| 8,843,281 B2 | 9/2014 | Wilhelmi et al. |
| 8,850,995 B2 | 10/2014 | Garner et al. |
| 8,850,997 B2 | 10/2014 | Silbernagel et al. |
| 8,850,998 B2 | 10/2014 | Garner et al. |
| 8,863,676 B2 | 10/2014 | Brockmann et al. |
| 8,869,629 B2 | 10/2014 | Noble et al. |
| 8,869,719 B2 | 10/2014 | Garner et al. |
| 8,893,630 B2 | 11/2014 | Kowalchuk et al. |
| 8,910,582 B2 | 12/2014 | Mariman et al. |
| 8,925,471 B2 | 1/2015 | Adams et al. |
| 8,928,486 B2 | 1/2015 | Hui et al. |
| 8,942,894 B2 | 1/2015 | Garner et al. |
| 8,942,896 B2 | 1/2015 | Mayerle |
| 8,948,980 B2 | 2/2015 | Garner et al. |
| 8,985,037 B2 | 3/2015 | Radtke et al. |
| 9,010,258 B1 | 4/2015 | Richard et al. |
| 9,043,950 B2 | 6/2015 | Wendte et al. |
| 9,119,339 B2 | 9/2015 | Bergere |
| 9,137,942 B2 | 9/2015 | Adams et al. |
| 9,144,190 B2 | 9/2015 | Henry et al. |
| 9,148,992 B2 | 10/2015 | Staeter |
| 9,155,242 B2 | 10/2015 | Adams et al. |
| 9,179,594 B2 | 11/2015 | Graham |
| 9,179,595 B2 | 11/2015 | Kormann et al. |
| 9,198,343 B2 | 12/2015 | Mairman et al. |
| 9,216,860 B2 | 12/2015 | Friestad et al. |
| 9,237,687 B2 | 1/2016 | Sauder et al. |
| 9,265,191 B2 | 2/2016 | Sauder et al. |
| 9,277,688 B2 | 3/2016 | Wilhelmi et al. |
| 9,288,937 B2 | 3/2016 | Sauder et al. |
| 9,313,941 B2 | 4/2016 | Garner et al. |
| 9,313,943 B2 | 4/2016 | Zumdome et al. |
| 9,326,441 B2 | 5/2016 | Donadon |
| 9,332,688 B2 | 5/2016 | Zumdome et al. |
| 9,345,188 B2 | 5/2016 | Garner et al. |
| 9,345,189 B2 | 5/2016 | Harmelink et al. |
| 9,351,440 B2 | 5/2016 | Sauder |
| 9,357,689 B2 | 6/2016 | Beck et al. |
| 9,357,692 B2 | 6/2016 | Johnson et al. |
| 9,398,739 B2 | 7/2016 | Silbernagel et al. |
| 9,426,939 B2 | 8/2016 | Zumdome |
| 9,426,940 B2 | 8/2016 | Connors et al. |
| 9,445,539 B2 | 9/2016 | Rans |
| 9,451,740 B2 | 9/2016 | Kowalchuk |
| 9,475,497 B2 | 10/2016 | Henson et al. |
| 9,480,199 B2 | 11/2016 | Garner et al. |
| 9,510,502 B2 | 12/2016 | Garner et al. |
| 9,554,503 B2 | 1/2017 | Noer et al. |
| 9,578,799 B2 | 2/2017 | Allgaier et al. |
| 9,585,304 B2 | 3/2017 | Roberge et al. |
| 9,591,800 B2 | 3/2017 | Kowalchuk et al. |
| 9,596,803 B2 | 3/2017 | Wendte et al. |
| 9,603,298 B2 | 3/2017 | Wendte et al. |
| 9,615,504 B2 | 4/2017 | Sauder et al. |
| 9,622,401 B2 | 4/2017 | Stevenson |
| 9,629,298 B2 | 4/2017 | Dienst |
| 9,635,802 B2 | 5/2017 | Rains et al. |
| 9,635,804 B2 | 5/2017 | Carr et al. |
| 9,648,800 B2 | 5/2017 | Garner et al. |
| 9,648,802 B2 | 5/2017 | Wendte et al. |
| 9,661,799 B2 | 5/2017 | Garner et al. |
| 9,675,002 B2 | 6/2017 | Roszman |
| 9,675,004 B2 | 6/2017 | Landphair et al. |
| 9,686,905 B2 | 6/2017 | Garner et al. |
| 9,686,906 B2 | 6/2017 | Garner et al. |
| 9,693,496 B2 | 7/2017 | Tevs et al. |
| 9,693,498 B2 | 7/2017 | Zumdome et al. |
| 9,699,955 B2 | 7/2017 | Garner et al. |
| 9,706,701 B2 | 7/2017 | Prickel et al. |
| 9,706,702 B2 | 7/2017 | Wendte et al. |
| 9,706,705 B2 | 7/2017 | Czapka et al. |
| 9,723,779 B2 | 8/2017 | Wendte et al. |
| 9,730,377 B2 | 8/2017 | Kowalchuk et al. |
| 9,730,379 B2 | 8/2017 | Wendte et al. |
| 9,733,634 B2 | 8/2017 | Prickel et al. |
| 9,750,174 B2 | 9/2017 | Sauder et al. |
| 9,756,778 B2 | 9/2017 | Straeter |
| 9,756,779 B2 | 9/2017 | Wilhelmi et al. |

(56) References Cited

U.S. PATENT DOCUMENTS

| | | |
|---|---|---|
| 9,763,380 B2 | 9/2017 | Hahn et al. |
| 9,769,978 B2 | 9/2017 | Radtke |
| 9,775,279 B2 | 10/2017 | Garner et al. |
| 9,781,874 B2 | 10/2017 | Johnson et al. |
| 9,795,076 B2 | 10/2017 | Lind et al. |
| 9,795,077 B2 | 10/2017 | Hahn et al. |
| 9,801,332 B2 | 10/2017 | Landphair et al. |
| 9,807,922 B2 | 11/2017 | Garner et al. |
| 9,807,924 B2 | 11/2017 | Garner et al. |
| 9,814,172 B2 | 11/2017 | Achen et al. |
| 9,814,176 B2 | 11/2017 | Kowalchuk |
| 9,820,429 B2 | 11/2017 | Garner et al. |
| 9,826,676 B2 | 11/2017 | Borkgren et al. |
| 9,826,677 B2 | 11/2017 | Gervais et al. |
| 9,832,921 B2 | 12/2017 | Anderson et al. |
| 9,836,036 B2 | 12/2017 | Johnson et al. |
| 9,848,524 B2 | 12/2017 | Sauder et al. |
| 9,848,528 B2 | 12/2017 | Werner et al. |
| 9,854,732 B2 | 1/2018 | Thompson et al. |
| 9,861,025 B2 | 1/2018 | Schaefer et al. |
| 9,861,030 B2 | 1/2018 | Garner et al. |
| 9,861,031 B2 | 1/2018 | Garner et al. |
| 9,867,328 B2 | 1/2018 | Tevs et al. |
| 9,869,571 B2 | 1/2018 | Hoberge et al. |
| 9,883,625 B2 | 2/2018 | Kock et al. |
| 9,883,626 B2 | 2/2018 | Heim et al. |
| 9,888,624 B2 | 2/2018 | Maniar et al. |
| 9,894,830 B2 | 2/2018 | Horsch |
| 9,902,571 B2 | 2/2018 | Hui et al. |
| 9,918,427 B2 | 3/2018 | Anderson et al. |
| 9,936,625 B2 | 4/2018 | Wendte et al. |
| 9,936,630 B2 | 4/2018 | Johnson et al. |
| 9,936,631 B1 | 4/2018 | Hubner et al. |
| 9,943,027 B2 | 4/2018 | Sauder et al. |
| 9,949,426 B2 | 4/2018 | Radtke et al. |
| 9,949,427 B2 | 4/2018 | Schweitzer et al. |
| 9,955,625 B2 | 5/2018 | Baurer et al. |
| 9,961,825 B2 | 5/2018 | Allgaier et al. |
| 9,964,124 B2 | 5/2018 | Maro |
| 9,968,029 B2 | 5/2018 | Funck et al. |
| 9,969,569 B2 | 5/2018 | Borkgren |
| 9,970,490 B2 | 5/2018 | Henry et al. |
| 9,974,230 B2 | 5/2018 | Sauder et al. |
| 9,979,338 B2 | 5/2018 | Dollinger et al. |
| 9,999,174 B2 | 6/2018 | Funck et al. |
| 9,999,175 B2 | 6/2018 | Baurer et al. |
| 10,004,173 B2 | 6/2018 | Garner et al. |
| 10,010,025 B2 | 7/2018 | Dienst et al. |
| 10,028,427 B2 | 7/2018 | Arnett et al. |
| 10,028,428 B2 | 7/2018 | Moorehead et al. |
| 10,028,436 B2 | 7/2018 | Ricketts et al. |
| 10,045,474 B2 | 8/2018 | Bachman et al. |
| 10,045,478 B2 | 8/2018 | Posselius |
| 10,051,782 B2 | 8/2018 | Wilhelmi et al. |
| 10,064,323 B2 | 9/2018 | Hahn et al. |
| 10,085,375 B2 | 10/2018 | Engel et al. |
| 10,091,926 B2 | 10/2018 | Maro |
| 10,104,830 B2 | 10/2018 | Heathcote |
| 10,117,377 B2 | 11/2018 | Dienst et al. |
| 10,123,524 B2 | 11/2018 | Roberge et al. |
| 10,154,622 B2 | 12/2018 | Thompson |
| 10,159,176 B2 | 12/2018 | Baitinger et al. |
| 10,165,724 B2 | 1/2019 | Nilson et al. |
| 10,172,277 B2 | 1/2019 | Thompson |
| 10,188,027 B2 | 1/2019 | Hahn et al. |
| 10,206,325 B2 | 2/2019 | Schoeny et al. |
| 10,206,326 B2 | 2/2019 | Garner et al. |
| 10,225,978 B1 | 3/2019 | Schoeny et al. |
| 10,227,998 B2 | 3/2019 | Lacher et al. |
| 10,231,376 B1 | 3/2019 | Stanhope et al. |
| 10,257,974 B1 | 4/2019 | Schoeny et al. |
| 10,264,723 B2 | 4/2019 | Gresch et al. |
| 10,278,325 B2 | 5/2019 | Anderson et al. |
| 10,296,017 B2 | 5/2019 | Schoeny et al. |
| 10,299,424 B2 | 5/2019 | Hamilton |
| 10,306,824 B2 | 6/2019 | Nelson et al. |
| 10,308,116 B2 | 6/2019 | Czapka et al. |
| 10,337,645 B2 | 7/2019 | Roberge et al. |
| 10,351,364 B2 | 7/2019 | Green et al. |
| 10,368,478 B2 | 8/2019 | Schoeny et al. |
| 10,375,879 B2 | 8/2019 | Garner et al. |
| 10,379,547 B2 | 8/2019 | Thompson et al. |
| 10,408,667 B2 | 9/2019 | Schoeny et al. |
| 10,426,073 B2 | 10/2019 | Totten et al. |
| 10,433,475 B2 | 10/2019 | Gentili et al. |
| 10,448,561 B2 | 10/2019 | Schoeny et al. |
| 10,455,757 B2 | 10/2019 | Sauder et al. |
| 10,455,758 B2 | 10/2019 | Schoeny et al. |
| 10,455,760 B2 | 10/2019 | Stuber et al. |
| 10,462,956 B2 | 11/2019 | Hamilton |
| 10,462,960 B2 | 11/2019 | Duman |
| 10,470,355 B2 | 11/2019 | Renault et al. |
| 10,477,757 B2 | 11/2019 | Schoeny et al. |
| 10,481,617 B2 | 11/2019 | Engel et al. |
| 10,485,154 B2 | 11/2019 | Connell et al. |
| 10,524,409 B2 | 1/2020 | Posselius et al. |
| 10,524,410 B2 | 1/2020 | Schoeny et al. |
| 10,531,606 B2 | 1/2020 | Posselius |
| 10,537,055 B2 | 1/2020 | Gresch et al. |
| 10,548,259 B2 | 2/2020 | Heathcote |
| 10,555,454 B2 | 2/2020 | Gerner et al. |
| 10,561,052 B2 | 2/2020 | Barrick et al. |
| 10,575,456 B2 | 3/2020 | Schoeny et al. |
| 10,575,459 B2 | 3/2020 | Gervais et al. |
| 10,575,460 B2 | 3/2020 | Davis et al. |
| 10,582,655 B2 | 3/2020 | Kowalchuk |
| 10,602,656 B2 | 3/2020 | Bartelson et al. |
| 10,645,863 B2 | 5/2020 | Grimm et al. |
| 10,653,056 B2 | 5/2020 | Garner et al. |
| 10,660,261 B2 | 5/2020 | Johnson et al. |
| 10,667,461 B2 | 6/2020 | Kowalchuk et al. |
| 10,709,058 B2 | 7/2020 | Thompson |
| 10,729,054 B2 | 8/2020 | Dekam |
| 10,729,063 B2 | 8/2020 | Garner et al. |
| 10,743,460 B2 | 8/2020 | Gilbert et al. |
| 10,750,658 B2 | 8/2020 | Schoeny et al. |
| 10,750,662 B2 | 8/2020 | Garner et al. |
| 10,750,663 B2 | 8/2020 | Garner et al. |
| 10,757,854 B2 | 9/2020 | Stanhope |
| 10,765,057 B2 | 9/2020 | Radtke et al. |
| 10,768,331 B2 | 9/2020 | Koch et al. |
| 10,772,256 B2 | 9/2020 | Stuber |
| 10,779,456 B2 | 9/2020 | Kowalchuk |
| 10,779,460 B2 | 9/2020 | Pirkenseer |
| 10,779,462 B2 | 9/2020 | Gresch et al. |
| 10,806,062 B2 | 10/2020 | Zemenchik |
| 10,806,070 B2 | 10/2020 | Garner et al. |
| 10,806,071 B2 | 10/2020 | Kowalchuk |
| 10,813,276 B2 | 10/2020 | Heathcote |
| 10,820,464 B2 | 11/2020 | Kowalchuk et al. |
| 10,820,465 B2 | 11/2020 | Kowalchuk et al. |
| 10,820,483 B2 | 11/2020 | Gervais et al. |
| 10,820,485 B2 | 11/2020 | Swanson et al. |
| 10,820,488 B2 | 11/2020 | Schoeny et al. |
| 10,820,489 B2 | 11/2020 | Garner et al. |
| 10,820,490 B2 | 11/2020 | Schoeny et al. |
| 10,823,748 B2 | 11/2020 | Allgaier |
| 10,827,663 B2 | 11/2020 | Gresch et al. |
| 10,827,666 B2 | 11/2020 | Schoeny et al. |
| 10,827,671 B2 | 11/2020 | Kowalchuk et al. |
| 10,827,740 B2 | 11/2020 | Wonderlich et al. |
| 10,842,068 B2 | 11/2020 | Czapka et al. |
| 10,842,072 B2 | 11/2020 | Wilhelmi et al. |
| 10,842,073 B2 | 11/2020 | Garner et al. |
| 10,860,189 B2 | 12/2020 | Allgaier et al. |
| RE48,572 E | 6/2021 | Garner et al. |
| 2009/0292426 A1 | 11/2009 | Nelson et al. |
| 2010/0224110 A1 | 9/2010 | Mariman |
| 2011/0067260 A1 | 3/2011 | Kim et al. |
| 2012/0265410 A1 | 10/2012 | Graham et al. |
| 2013/0032363 A1 | 2/2013 | Curry et al. |
| 2014/0277959 A1 | 9/2014 | Wagers et al. |
| 2015/0223392 A1 | 8/2015 | Wilhelmi et al. |
| 2015/0237793 A1 | 8/2015 | Rans |

(56) References Cited

U.S. PATENT DOCUMENTS

| | | | |
|---|---|---|---|
| 2015/0351315 A1* | 12/2015 | Wendte | A01C 19/02 111/183 |
| 2016/0037713 A1* | 2/2016 | Wendte | A01C 7/046 111/177 |
| 2016/0229575 A1 | 8/2016 | Lapointe | |
| 2017/0000008 A1 | 1/2017 | Anderson et al. | |
| 2017/0049040 A1 | 2/2017 | Kinzenbaw | |
| 2017/0142891 A1 | 5/2017 | Lucas et al. | |
| 2017/0156256 A1 | 6/2017 | Allgaier | |
| 2017/0339819 A1 | 11/2017 | Kowalchuk et al. | |
| 2017/0359949 A1 | 12/2017 | Garner et al. | |
| 2018/0014457 A1 | 1/2018 | Mertlich et al. | |
| 2018/0035603 A1 | 2/2018 | Kremmer et al. | |
| 2018/0035622 A1 | 2/2018 | Gresch et al. | |
| 2018/0049367 A1 | 2/2018 | Garner et al. | |
| 2018/0110186 A1 | 4/2018 | Bovee | |
| 2018/0116102 A1 | 5/2018 | Taylor et al. | |
| 2018/0153094 A1 | 6/2018 | Radtke et al. | |
| 2018/0168104 A1 | 6/2018 | Johnson et al. | |
| 2018/0192577 A1 | 7/2018 | Smith et al. | |
| 2018/0224537 A1 | 8/2018 | Taylor et al. | |
| 2018/0249621 A1 | 9/2018 | Horsch | |
| 2018/0259979 A1 | 9/2018 | Schoeny et al. | |
| 2018/0263177 A1 | 9/2018 | Heathcote | |
| 2018/0310468 A1 | 11/2018 | Schoeny et al. | |
| 2019/0029165 A1 | 1/2019 | Leimkuehler et al. | |
| 2019/0075714 A1 | 3/2019 | Koch et al. | |
| 2019/0098828 A1 | 4/2019 | Wilhelmi et al. | |
| 2019/0116721 A1 | 4/2019 | Donadon et al. | |
| 2019/0116722 A1 | 4/2019 | Donadon et al. | |
| 2019/0124824 A1 | 5/2019 | Hubner et al. | |
| 2019/0141880 A1 | 5/2019 | Zemenchik et al. | |
| 2019/0150350 A1 | 5/2019 | Engel et al. | |
| 2019/0159398 A1 | 5/2019 | McMenamy et al. | |
| 2019/0162164 A1 | 5/2019 | Funk et al. | |
| 2019/0183036 A1 | 6/2019 | Leimkuehler et al. | |
| 2019/0223372 A1 | 7/2019 | Koch et al. | |
| 2019/0230845 A1 | 8/2019 | Buchner et al. | |
| 2019/0230846 A1 | 8/2019 | Koch et al. | |
| 2019/0230847 A1 | 8/2019 | Forrest et al. | |
| 2019/0239425 A1 | 8/2019 | Garner et al. | |
| 2019/0246551 A1 | 8/2019 | Campbell et al. | |
| 2019/0246552 A1 | 8/2019 | Sauder et al. | |
| 2019/0254222 A1 | 8/2019 | Rhodes et al. | |
| 2019/0289774 A1 | 9/2019 | Prystupa et al. | |
| 2019/0289776 A1 | 9/2019 | Rempel et al. | |
| 2019/0289778 A1 | 9/2019 | Koch et al. | |
| 2019/0289779 A1 | 9/2019 | Koch et al. | |
| 2019/0343037 A1 | 11/2019 | Werner et al. | |
| 2019/0343038 A1 | 11/2019 | Wilhelmi | |
| 2019/0364724 A1 | 12/2019 | Radtke et al. | |
| 2019/0373797 A1 | 12/2019 | Schoeny et al. | |
| 2019/0373801 A1 | 12/2019 | Schoeny et al. | |
| 2019/0380259 A1 | 12/2019 | Frank et al. | |
| 2019/0387663 A1 | 12/2019 | Wang et al. | |
| 2020/0000003 A1 | 1/2020 | Kowalchuk et al. | |
| 2020/0000009 A1 | 1/2020 | Henry et al. | |
| 2020/0000011 A1 | 1/2020 | Hebner et al. | |
| 2020/0000012 A1 | 1/2020 | Hubner et al. | |
| 2020/0000013 A1 | 1/2020 | Rylander et al. | |
| 2020/0000016 A1 | 1/2020 | Hubner et al. | |
| 2020/0008340 A1 | 1/2020 | Stanhope | |
| 2020/0015405 A1 | 1/2020 | Kowalchuk et al. | |
| 2020/0015406 A1 | 1/2020 | Wright et al. | |
| 2020/0022300 A1 | 1/2020 | Gervais et al. | |
| 2020/0045869 A1 | 2/2020 | Stanhope et al. | |
| 2020/0045877 A1 | 2/2020 | Riffel et al. | |
| 2020/0053955 A1 | 2/2020 | Borkgren et al. | |
| 2020/0068778 A1 | 3/2020 | Schoeny et al. | |
| 2020/0068788 A1 | 3/2020 | Frank et al. | |
| 2020/0100421 A1 | 4/2020 | Wang | |
| 2020/0100423 A1 | 4/2020 | Dienst | |
| 2020/0107487 A1 | 4/2020 | Antich | |
| 2020/0107492 A1 | 4/2020 | Antich | |
| 2020/0107493 A1 | 4/2020 | Straeter | |
| 2020/0107498 A1 | 4/2020 | Anderson et al. | |
| 2020/0113118 A1 | 4/2020 | Stanhope | |
| 2020/0113169 A1 | 4/2020 | Jelenkovic et al. | |
| 2020/0128724 A1 | 4/2020 | Stoller et al. | |
| 2020/0128725 A1 | 4/2020 | Rhodes et al. | |
| 2020/0132654 A1 | 4/2020 | Pomedli | |
| 2020/0146200 A1 | 5/2020 | Schoeny et al. | |
| 2020/0156470 A1 | 5/2020 | Stanhope et al. | |
| 2020/0196515 A1 | 6/2020 | Engel | |
| 2020/0196520 A1 | 6/2020 | Schoeny et al. | |
| 2020/0205337 A1 | 7/2020 | Millie et al. | |
| 2020/0214193 A1 | 7/2020 | Shivak | |
| 2020/0236842 A1 | 7/2020 | Buehler | |
| 2020/0245529 A1 | 8/2020 | Thompson et al. | |
| 2020/0245535 A1 | 8/2020 | Schilling et al. | |
| 2020/0253107 A1 | 8/2020 | Madison et al. | |
| 2020/0260630 A1 | 8/2020 | Stanhope et al. | |
| 2020/0260633 A1 | 8/2020 | Kovach et al. | |
| 2020/0260634 A1 | 8/2020 | Kovach et al. | |
| 2020/0260637 A1 | 8/2020 | Thompson et al. | |
| 2020/0267355 A1 | 8/2020 | Mentzer | |
| 2020/0267882 A1 | 8/2020 | Mcluckie et al. | |
| 2020/0281111 A1 | 9/2020 | Walter et al. | |
| 2020/0281112 A1 | 9/2020 | Salowitz et al. | |
| 2020/0281182 A1 | 9/2020 | Kiefer et al. | |
| 2020/0296882 A1 | 9/2020 | Madison et al. | |
| 2020/0315081 A1 | 10/2020 | Plattner | |
| 2020/0329627 A1 | 10/2020 | Johnson et al. | |
| 2020/0329628 A1 | 10/2020 | Mcluckie et al. | |
| 2020/0329631 A1 | 10/2020 | Johnson et al. | |
| 2020/0337200 A1 | 10/2020 | Smith | |
| 2020/0337209 A1 | 10/2020 | Kowalchuk | |
| 2020/0337213 A1 | 10/2020 | Schoeny | |
| 2020/0337218 A1 | 10/2020 | Puhalla et al. | |
| 2020/0337222 A1 | 10/2020 | Anderson et al. | |
| 2020/0337223 A1 | 10/2020 | Snipes et al. | |
| 2020/0344943 A1 | 11/2020 | Garner et al. | |
| 2020/0344944 A1 | 11/2020 | Wonderlich et al. | |
| 2020/0352081 A1 | 11/2020 | Arnett et al. | |
| 2020/0352087 A1 | 11/2020 | Garner et al. | |
| 2020/0355667 A1 | 11/2020 | Schoeny et al. | |
| 2020/0359551 A1 | 11/2020 | Donadon et al. | |
| 2020/0359557 A1 | 11/2020 | Utz | |
| 2020/0359559 A1 | 11/2020 | Koch et al. | |
| 2020/0375079 A1 | 12/2020 | Smith et al. | |
| 2020/0375088 A1 | 12/2020 | Utz | |
| 2020/0375090 A1 | 12/2020 | Morgan et al. | |
| 2020/0383262 A1 | 12/2020 | Schoeny et al. | |
| 2020/0387720 A1 | 12/2020 | Stanhope | |
| 2020/0390022 A1 | 12/2020 | Stanhope | |
| 2020/0390025 A1 | 12/2020 | Schoeny et al. | |
| 2020/0390026 A1 | 12/2020 | Walter et al. | |
| 2020/0396888 A1 | 12/2020 | Steinke et al. | |
| 2020/0396889 A1 | 12/2020 | Kowalchuk | |
| 2020/0396896 A1 | 12/2020 | Donadon et al. | |
| 2020/0396897 A1 | 12/2020 | Stoller et al. | |
| 2020/0404831 A1 | 12/2020 | Kowalchuk et al. | |
| 2020/0404832 A1 | 12/2020 | Schoeny et al. | |
| 2020/0404833 A1 | 12/2020 | Stanhope et al. | |
| 2020/0404837 A1 | 12/2020 | Thompson et al. | |
| 2021/0007271 A1 | 1/2021 | Schoeny et al. | |
| 2021/0007272 A1 | 1/2021 | Schoeny et al. | |

FOREIGN PATENT DOCUMENTS

| | | |
|---|---|---|
| BR | 202016000413 U2 | 10/2017 |
| BR | 202016001378 U2 | 10/2017 |
| BR | 102019000833 A2 | 7/2020 |
| CA | 2291598 C | 2/2007 |
| CN | 2857433 Y | 1/2007 |
| CN | 102763507 A | 11/2012 |
| CN | 203233664 U | 10/2013 |
| CN | 203801244 U | 9/2014 |
| CN | 104956815 A | 10/2015 |
| CN | 105850308 A | 8/2016 |
| CN | 205755411 U | 12/2016 |
| CN | 205993088 U | 3/2017 |
| CN | 106612772 A | 5/2017 |
| CN | 107087462 A | 8/2017 |

(56) References Cited

FOREIGN PATENT DOCUMENTS

| | | |
|---|---|---|
| CN | 108064507 A | 5/2018 |
| CN | 107667630 B | 7/2018 |
| CN | 108243683 A | 7/2018 |
| CN | 207573891 U | 7/2018 |
| CN | 108353582 A | 8/2018 |
| CN | 108650948 A | 10/2018 |
| CN | 108781647 A | 11/2018 |
| CN | 109168453 A | 1/2019 |
| CN | 208317369 U | 1/2019 |
| CN | 109451928 A | 3/2019 |
| CN | 109451931 A | 3/2019 |
| CN | 209314270 U | 8/2019 |
| CN | 209314271 U | 8/2019 |
| CN | 111406477 A | 7/2020 |
| CN | 111630983 A | 9/2020 |
| CN | 111886974 A | 11/2020 |
| CN | 212393213 U | 1/2021 |
| DE | 3003919 A1 | 8/1981 |
| DE | 3441704 A1 | 5/1986 |
| DE | 202005002495 U1 | 5/2005 |
| DE | 202005005276 U1 | 6/2005 |
| DE | 202008008487 U1 | 8/2008 |
| DE | 102015101256 A1 | 7/2016 |
| DE | 102015121600 A1 | 6/2017 |
| DE | 102016207510 A1 | 11/2017 |
| DE | 102016218859 A1 | 3/2018 |
| DE | 102017203854 A1 | 9/2018 |
| DE | 102017109042 A1 | 10/2018 |
| DE | 102018111584 A1 | 11/2019 |
| DE | 102018112948 A1 | 12/2019 |
| DE | 102018120184 A1 | 2/2020 |
| DE | 202020102846 U1 | 6/2020 |
| DE | 202020104231 U1 | 7/2020 |
| DE | 102019108987 A1 | 10/2020 |
| DE | 102019118149 A1 | 1/2021 |
| EP | 0237766 A1 | 9/1987 |
| EP | 2374342 B1 | 5/2013 |
| EP | 3127415 A1 | 2/2017 |
| EP | 3135089 A1 | 3/2017 |
| EP | 2853141 B1 | 6/2017 |
| EP | 2974582 B1 | 9/2017 |
| EP | 2901838 B1 | 11/2017 |
| EP | 2832200 B1 | 5/2018 |
| EP | 3065529 B1 | 5/2018 |
| EP | 3332624 A1 | 6/2018 |
| EP | 3338524 A1 | 6/2018 |
| EP | 2932818 B1 | 8/2018 |
| EP | 3366098 A1 | 8/2018 |
| EP | 3219186 B1 | 11/2018 |
| EP | 3440910 A1 | 2/2019 |
| EP | 3440911 A1 | 2/2019 |
| EP | 2959762 B1 | 5/2019 |
| EP | 3305054 B1 | 7/2019 |
| EP | 3284332 B1 | 10/2019 |
| EP | 3278649 B1 | 11/2019 |
| EP | 3281509 B1 | 11/2019 |
| EP | 3372064 B1 | 2/2020 |
| EP | 3360403 A1 | 4/2020 |
| EP | 3372065 B1 | 4/2020 |
| EP | 3417689 B1 | 4/2020 |
| EP | 3440909 B1 | 4/2020 |
| EP | 3127414 B1 | 5/2020 |
| EP | 3530095 B1 | 9/2020 |
| EP | 3501250 B1 | 11/2020 |
| EP | 3520592 B1 | 12/2020 |
| FR | 2961058 A1 | 12/2011 |
| GB | 1253688 A | 11/1971 |
| GB | 2057835 A | 4/1981 |
| JP | 2005333895 A | 12/2005 |
| JP | 2013027389 A | 2/2013 |
| JP | 6523898 B2 | 6/2019 |
| JP | 6545240 B2 | 7/2019 |
| JP | 6546363 B2 | 7/2019 |
| JP | 2019150070 A | 9/2019 |
| JP | 2019165712 A | 10/2019 |
| RU | 2230446 C1 | 6/2004 |
| RU | 2649332 C1 | 4/2018 |
| WO | 1994026090 A2 | 11/1994 |
| WO | WO2004017712 A1 | 3/2004 |
| WO | 2010088703 A1 | 8/2010 |
| WO | WO2015048867 A1 | 4/2015 |
| WO | WO2016071269 A1 | 5/2016 |
| WO | WO2017004074 A1 | 1/2017 |
| WO | 2017040533 A1 | 3/2017 |
| WO | 2017117638 A1 | 7/2017 |
| WO | 2018013859 A1 | 1/2018 |
| WO | WO2018054624 A1 | 3/2018 |
| WO | WO2018054625 A1 | 3/2018 |
| WO | 2018093568 A2 | 5/2018 |
| WO | WO2019050944 A1 | 3/2019 |
| WO | WO2019079205 A1 | 4/2019 |
| WO | WO2019091732 A1 | 5/2019 |
| WO | WO2019108881 A1 | 6/2019 |
| WO | WO2019197963 A1 | 10/2019 |
| WO | WO2020001964 A1 | 1/2020 |
| WO | WO2020011386 A1 | 1/2020 |
| WO | WO2020016047 A1 | 1/2020 |
| WO | WO2020035337 A1 | 2/2020 |
| WO | WO2020039322 A1 | 2/2020 |
| WO | WO2020046586 A1 | 3/2020 |
| WO | WO2020049387 A1 | 3/2020 |
| WO | WO2020109881 A1 | 6/2020 |
| WO | WO2020161566 A1 | 8/2020 |
| WO | WO2020187380 A1 | 9/2020 |
| WO | WO2020194150 A1 | 10/2020 |
| WO | WO2020227608 A1 | 11/2020 |
| WO | WO2020240301 A1 | 12/2020 |
| WO | WO2020247985 A1 | 12/2020 |
| WO | WO2021014231 A1 | 1/2021 |

OTHER PUBLICATIONS

Precision Planting, Precision Planting From County Line AG Services, Keeton Seed Firmers, http://countylineag.ohag4u.com/precision_planting.htm, Feb. 8, 2019, 2 pages.
Lamb and Webster, PrecisionMeter, Improve Planter Performance Where it Counts—In the Meter, http://www.lambandwebster.com/precision-planting/precisionmeter/, 2017, 4 pages.
Planterology, SpeedTube, https://planterology.com/solutions/speedtube/, Feb. 12, 2019, 5 pages.
John Deere, John Deere Exactmerge Planter Trench Delivery System and Brushbelt Delivery System, Cross Implement, https://crossimpiement.com/news-and-updates/article/2015/06/john-deere-exactemerge-planter-trench-delivery-system-and-brushbelttm-delivery-system, Jun. 11, 2015, 6 pages.
Lamb and Webster, SpeedTube, Focused on the Perfect Plant—and Speed., http://www.lambandwebster.com/precision-planting/speedtube/, 2017, 6 pages.
Precision Planting, PrecisionMeter A Better Finger Meter, Improve Planter Performance Where it Counts—In the Meter, https://www.precisionplanting.com/products/product/precisionmeter, Mar. 7, 2019, 15 pages.
U.S. Appl. No. 16/726,346, filed Dec. 24, 2019, Chad Michael Johnson.
U.S. Appl. No. 16/726,388, filed Dec. 24, 2019, Chad Michael Johnson.
U.S. Appl. No. 16/726,404, filed Dec. 24, 2019, Chad Michael Johnson.
U.S. Appl. No. 16/726,435, filed Dec. 24, 2019, Chad Michael Johnson.
U.S. Appl. No. 16/726,470, filed Dec. 24, 2019, Chad Michael Johnson.
U.S. Appl. No. 16/726,501, filed Dec. 24, 2019, Chad Michael Johnson.
U.S. Appl. No. 16/726,528, filed Dec. 24, 2019, Chad Michael Johnson.
U.S. Appl. No. 16/726,558, filed Dec. 24, 2019, Chad Michael Johnson.
U.S. Appl. No. 16/726,598, filed Dec. 24, 2019, Chad Michael Johnson.

(56) References Cited

OTHER PUBLICATIONS

U.S. Appl. No. 16/726,619, filed Dec. 24, 2019, Chad Michael Johnson.
U.S. Appl. No. 16/726,670, filed Dec. 24, 2019, Chad Michael Johnson.

* cited by examiner

PARTICLE DELIVERY SYSTEM OF AN AGRICULTURAL ROW UNIT

BACKGROUND

The present disclosure relates generally to a particle delivery system of an agricultural row unit.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product delivery system (e.g., including a metering system and a seed tube) is configured to deposit seeds and/or other agricultural products (e.g., fertilizer) into the trench. The opener/agricultural product delivery system is followed by closing discs that move displaced soil back into the trench and/or a packer wheel that packs the soil on top of the deposited seeds/other agricultural products.

Certain row units, or planting implements generally, include a seed storage area configured to store the seeds. The agricultural product delivery system is configured to transfer the seeds from the seed storage area into the trench. For example, the agricultural product delivery system may include a metering system that meters the seeds from the seed storage area into a seed tube for subsequent delivery to the trench. Certain types of seeds may benefit from a particular spacing along the trench. Additionally, the planting implement having the row units may travel at varying speeds based on the type of seed being deposited into the soil, the type and structure of the soil within the field, and other factors. Typically, the row units output the seeds to the trench at the speed that the implement is traveling through the field, which may affect the spacing between the seeds and may cause the seeds to be deposited at locations along the trench other than target locations (e.g., outside the target locations).

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particle delivery system of an agricultural row unit includes a first particle disc configured to meter a plurality of particles from a particle storage area and a second particle disc configured to receive each particle of the plurality of particles from the first particle disc and to transfer the particle toward a trench in soil. The first particle disc includes one or more first apertures, and the second particle disc includes one or more second apertures. The particle delivery system includes a vacuum source in fluid communication with a first vacuum passage positioned adjacent to the first particle disc and with a second vacuum passage positioned adjacent to the second particle disc. The vacuum source is configured to reduce air pressure within the first vacuum passage to couple a particle of the plurality of particles to a first respective aperture of the one or more first apertures while the first respective aperture is aligned with the first vacuum passage. The vacuum source is also configured to reduce air pressure within the second vacuum passage to couple the particle to a second respective aperture of the one or more second apertures while the second respective aperture is aligned within the second vacuum passage. A rotation rate of the first particle disc is controllable to establish a particle spacing between the plurality of particles within the trench, and a rotation rate of the second particle disc is controllable to expel each particle of the plurality of particles at a particle exit speed.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
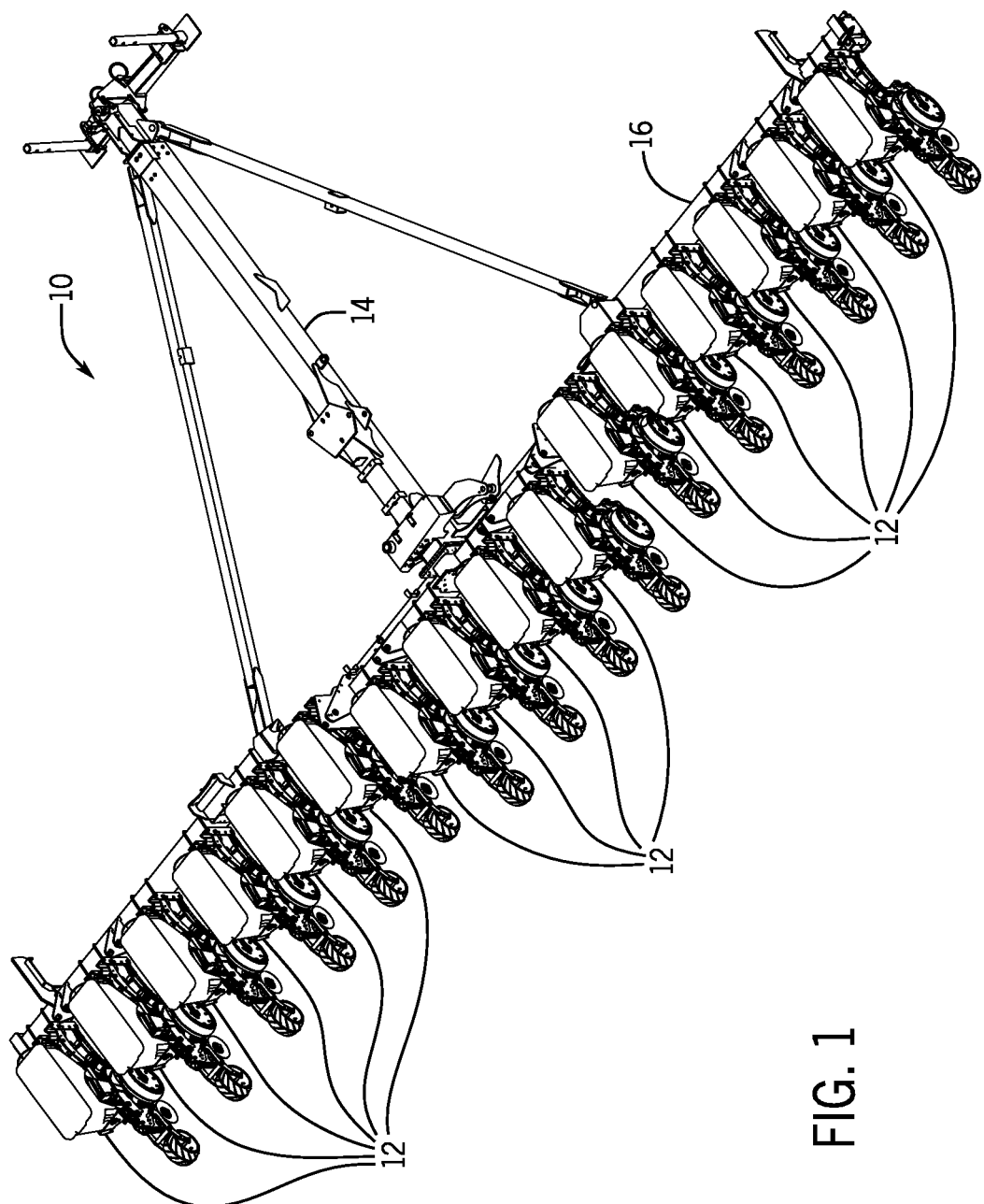
FIG. 1 is a perspective view of an embodiment of an agricultural implement having multiple row units distributed across a width of the agricultural implement, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a particle delivery system for a row unit of an agricultural implement. Certain agricultural implements include row units configured to deliver particles (e.g., seeds) to trenches in soil. For example, a particle distribution system may transport the particles from a storage tank of the agricultural implement to the row units (e.g., to a hopper assembly of each row unit or directly to a particle delivery system of each row unit), and/or the particles may be delivered from a hopper assembly of each row unit to a respective particle delivery system. Each particle delivery system may output the particles to a respective trench as the agricultural implement travels over the soil. Certain agricultural implements are configured to travel at particular speeds (e.g., between four kilometers per hour (kph) and thirty kph) while delivering the particles to the trenches. Additionally, a particular spacing between the particles when disposed within the soil may enhance plant development and/or yield.

Accordingly, in certain embodiments, at least one row unit of the agricultural implement includes a particle delivery system configured to deliver the particles to the respective trench in the soil at a particular spacing while reducing the relative ground speed of the particles (e.g., the speed of the particles relative to the ground). The particle delivery system includes a first particle disc configured to meter individual particles, thereby establishing the particular spacing between particles. The first particle disc is configured to release each particle at a release point of the first particle disc, thereby enabling the particle to move to an engagement point of a second particle disc. The second particle disc is configured to receive each particle at the engagement point. The second particle disc is also configured to transport each particle from the engagement point to a release point of the second particle disc. The second particle disc is configured to accelerate each particle, thereby increasing the speed of the particle at the release point, as compared to the engagement point. For example, the second particle disc may accelerate the particles to a speed greater than a speed resulting from gravitational acceleration alone. Additionally, the second particle disc may accelerate the particles such that the particle delivery system reduces the relative ground speed of the particles. As such, the second particle disc may enable the row unit to travel faster than traditional row units that utilize seed tubes, which rely on gravity to accelerate the particles (e.g., seeds) for delivery to soil.

In certain embodiments, the particle delivery system may include an air flow system configured to secure the particles to the first particle disc and/or to the second particle disc, to remove the particles from the first particle disc, to accelerate the particles downwardly from the first particle disc toward the second particle disc, or a combination thereof. For example, the air flow system may include a vacuum source configured to reduce the air pressure within a vacuum passage positioned along a portion of the first particle disc, thereby securing the particles to the first particle disc. In certain embodiments, the vacuum source may also be configured to reduce the air pressure within a vacuum passage positioned along a portion of the second particle disc, thereby securing the particles to the second particle disc. Additionally, the air flow system may provide an air flow configured to remove the particles from the first particle disc at the release point.

In some embodiments, the particle delivery system may include a particle transfer assembly configured to facilitate transferring the particles from the first particle disc to the second particle disc. For example, the particle transfer assembly may include a guide wheel disposed between the first particle disc and the second particle disc and configured to rotate to guide the particles from the first particle disc toward the second particle disc. In certain embodiments, the particle transfer assembly may include a particle tube extending from the release point of the first particle disc to the engagement point of the second particle disc and configured to guide the particles from the first particle disc to the second particle disc. In some embodiments, the particle transfer assembly may be configured to accelerate the particles flowing from the first particle disc toward the second particle disc.

With the foregoing in mind, the present embodiments relating to particle delivery systems may be utilized within any suitable agricultural implement. For example, FIG. 1 is a perspective view of an embodiment of an agricultural implement 10 having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a particle path (e.g., trench) within soil of a field. The row unit 12 may also include a particle delivery system (e.g., particle discs) configured to deposit particles (e.g., seeds, fertilizer, and/or other agricultural product(s)) into the particle path/trench. In addition, the row unit 12 may include closing disc(s) and/or a packer wheel positioned behind the particle delivery system. The closing disc(s) are configured to move displaced soil back into the particle path/trench, and the packer wheel is configured to pack soil on top of the deposited particles.

During operation, the agricultural implement 10 may travel at a particular speed along the soil surface while depositing the particles to the trenches. For example, a speed of the agricultural implement may be selected and/or controlled based on soil conditions, a type of the particles delivered by the agricultural implement 10 to the soil, weather conditions, a size/type of the agricultural implement, or a combination thereof. Additionally or alternatively, a particular spacing between the particles when disposed within the soil may enhance plant development and/or yield. Accordingly, in certain embodiments, at least one row unit 12 may include a particle delivery system configured to deposit the particles at the particular spacing while reducing the ground speed of the particles (e.g., as compared to a row unit that employs a particle tube to delivery particles to the soil). As discussed in detail below, the particle delivery system may include a first particle disc configured to meter individual particles to a second particle disc to establish the spacing between the particles. Additionally, the second particle disc may receive the particles and move and accelerate the particles toward the trench in the soil. The second particle disc may accelerate the particles to a speed greater than a speed resulting from gravitational acceleration alone (e.g., a speed resulting from the particle falling directly from the first disc to the ground with the second disc omitted) and may reduce the relative ground speed of the particles (e.g., the speed of the particles relative to the ground). In certain embodiments, the particle delivery system may include additional particle disc(s) (e.g., a third particle disc) and/or a particle belt configured to progressively accelerate the particles. As such, the particle delivery system may enable the row unit 12 to travel faster than traditional row units that utilize seed tubes, which rely on gravity to accelerate the particles (e.g., seeds) for delivery to the soil. As a result, the agricultural implement 10 may travel faster through the field and more accurately place each particle within the soil of the field.

Figure 2:
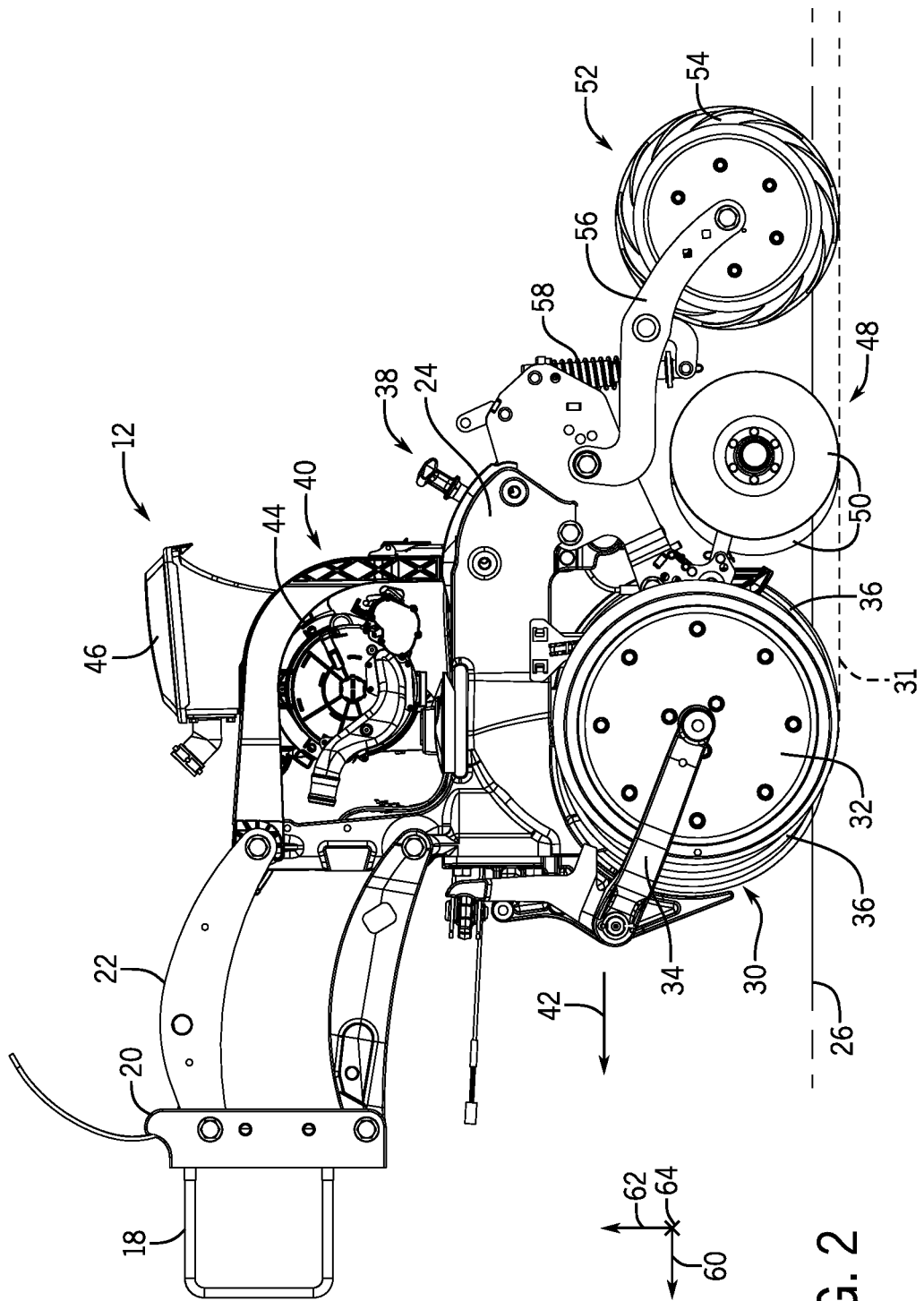
FIG. 2 is a side view of an embodiment of a row unit that may be employed on the agricultural implement of FIG. 1, in accordance with an aspect of the present disclosure.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a U-bolt that secures a bracket 20 of the row unit 12 to the tool bar. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a soil surface 26. In certain embodiments, a down pressure system (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), in alternative embodiments, another suitable linkage assembly may extend between the bracket and the frame.

The row unit 12 includes an opener assembly 30 that forms a trench 31 in the soil surface 26 for particle deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate the trench 31 into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 includes a particle delivery system 40 configured to deposit particles (e.g., seeds, fertilizer, and/or other agricultural product(s)) into the trench 31 as the row unit 12 traverses the field along a direction of travel 42. As illustrated, the particle delivery system 40 includes a particle metering and singulation unit 44 configured to receive the particles (e.g., seeds) from a hopper assembly 46 (e.g., a particle storage area). In certain embodiments, a hopper of the hopper assembly may be integrally formed with a housing of the particle metering and singulation unit. The hopper assembly 46 is configured to store the particles for subsequent metering by the particle metering and singulation unit 44. As will be described in greater detail below, in some embodiments, the particle metering and singulation unit 44 includes a particle disc configured to rotate to transfer the particles from the hopper assembly 46 toward a second particle disc of the particle delivery system 40. The second particle disc of the particle delivery system 40 may generally be disposed between the particle metering and singulation unit 44 and the trench 31 and may transfer the particles received from the particle metering and singulation unit 44 to the trench 31. In some embodiments, the particle delivery system may include a particle belt disposed generally between the second particle disc and the trench. For example, the particle belt may receive the particles from the second particle disc and deliver the particles to the trench.

The opener assembly 30 and the particle delivery system 40 are followed by a closing assembly 48 that moves displaced soil back into the trench 31. In the illustrated embodiment, the closing assembly 48 includes two closing discs 50. However, in alternative embodiments, the closing assembly may include other closing devices (e.g., a single closing disc, etc.). In addition, in certain embodiments, the closing assembly may be omitted. In the illustrated embodiment, the closing assembly 48 is followed by a packing assembly 52 configured to pack soil on top of the deposited particles. The packing assembly 52 includes a packer wheel 54, an arm 56 that pivotally couples the packer wheel 54 to the frame 24, and a biasing member 58 configured to urge the packer wheel 54 toward the soil surface 26, thereby causing the packer wheel to pack soil on top of the deposited particles (e.g., seeds and/or other agricultural product(s)). While the illustrated biasing member 58 includes a spring, in alternative embodiments, the biasing member may include another suitable biasing device, such as a hydraulic cylinder or a pneumatic cylinder, among others. For purposes of discussion, reference may be made to a longitudinal axis or direction 60, a vertical axis or direction 62, and a lateral axis or direction 64. For example, the direction of travel 42 of the row unit 12 may be generally along the longitudinal axis 60.

Figure 3:
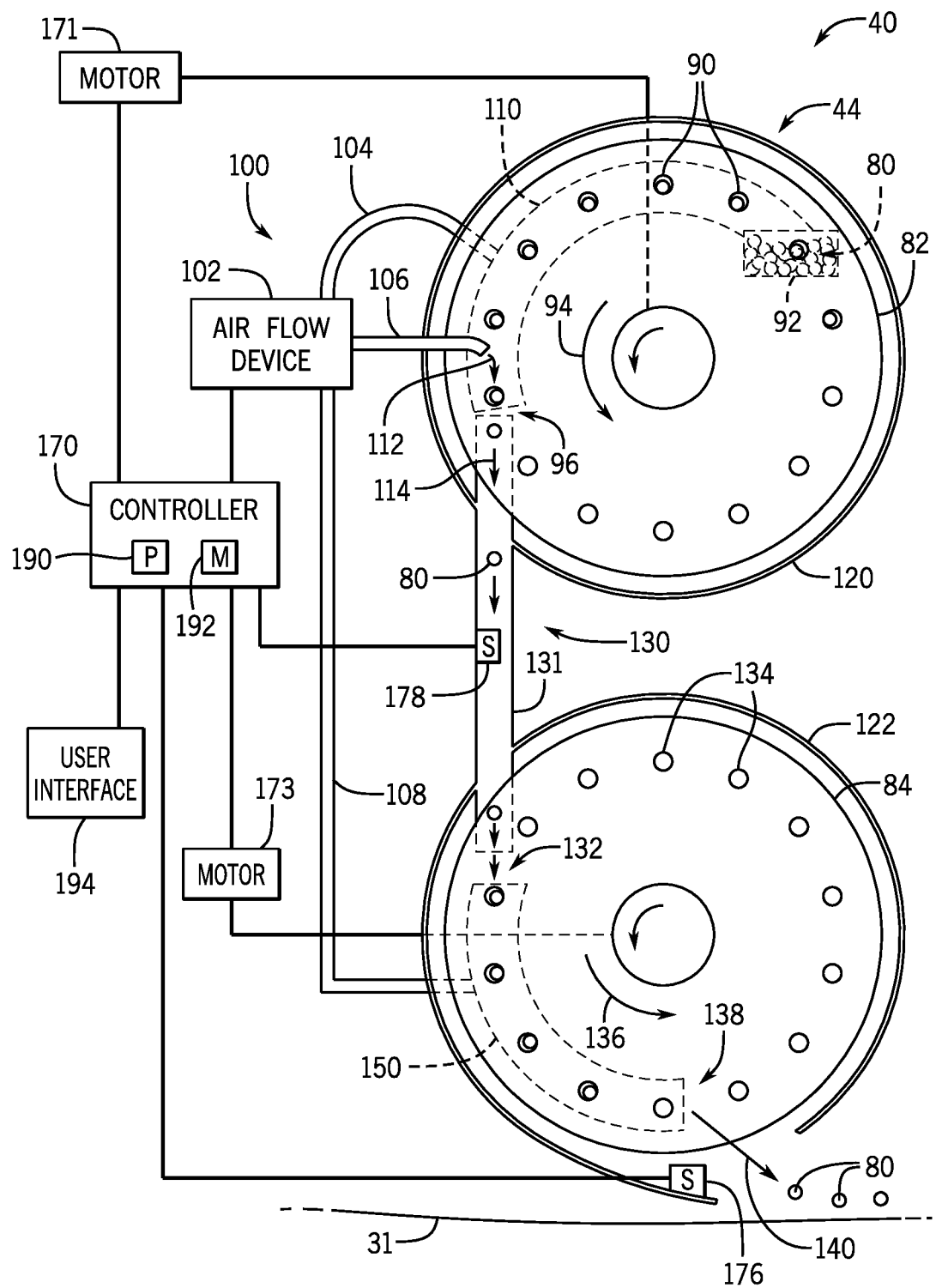
FIG. 3 is a side view of an embodiment of a particle delivery system that may be employed within the row unit of FIG. 2, in accordance with an aspect of the present disclosure.

FIG. 3 is a side view of an embodiment of a particle delivery system 40 that may be employed within the row unit of FIG. 2. As described above, the particle delivery system 40 is configured to meter and accelerate particles 80 (e.g., seeds, fertilizer, other particulate material, or a combination thereof) toward the trench 31 for deposition into the trench 31. In the illustrated embodiment, the particle delivery system 40 includes a first particle disc 82 (e.g., of the particle metering and singulation unit 44) configured to meter the particles 80 and a second particle disc 84 configured to accelerate and the move the particles 80 toward the trench 31 for deposition into the trench 31.

The first particle disc 82 has apertures 90 configured to receive the particles 80 from a particle hopper 92 of the particle delivery system 40. For example, each aperture 90 may receive a single particle 80. The particle hopper 92 is a particle storage area configured to store the particles 80 for subsequent metering and distribution. In certain embodiments, the particle hopper 92 may be coupled to and/or included as part of a housing of the particle metering and singulation unit 44. Furthermore, in some embodiments, the hopper assembly may provide the particles 80 to the particle hopper 92, and/or the hopper assembly (e.g., the hopper of the hopper assembly) may be coupled to the particle hopper 92. The first particle disc 82 is configured to rotate, as indicated by arrow 94, to move the particles 80 from the particle hopper 92 to a release point 96, where the particles 80 are released downwardly toward the second particle disc 84.

As illustrated, the particle delivery system 40 includes an air flow system 100 having an air flow device 102 (e.g., a vacuum source), a first air tube 104 fluidly coupled to the air flow device 102, a second air tube 106 fluidly coupled to the air flow device 102, and a third air tube 108 fluidly coupled to the air flow device 102. The air flow system 100 is configured to reduce the air pressure within a first vacuum passage 110 positioned along a portion of the first particle disc 82, thereby drawing the particles 80 from the particle hopper 92 toward and against the apertures 90. As illustrated, the first air tube 104 is fluidly coupled to the air flow device 102 and to the first vacuum passage 110. The air flow device 102 is configured to draw air through the apertures 90 while the apertures 90 are aligned with the first vacuum passage 110. As the first particle disc 82 rotates, the vacuum formed at the apertures 90 secures the particles 80 to the first particle disc 82 at the apertures 90, such that the first particle disc 82 moves each particle 80 from the particle hopper 92 to the release point 96. At the release point 96, the air flow system 100 provides, via the second air tube 106, an air flow 112 configured to remove each particle 80 from the respective aperture 90 (e.g., by overcoming the vacuum formed at the apertures 90). In certain embodiments, the air flow 112 may be omitted, and the particles 80 may be released from the apertures 90 due to the first vacuum passage 110 ending. For example, at the release point 96, the first vacuum passage 110 may end (e.g., the air flow device 102 may no longer draw air through the apertures 90 of the first particle disc 82 at the release point 96), and the particles 80 may no longer be secured in the apertures 90. The particles 80 are released from the first particle disc 82 along a release trajectory 114. Rotation of the first particle disc 82 imparts a velocity on the particles along the release trajectory 114, and the particles 80 accelerate downwardly along the release trajectory 114 under the influence of gravity. In some embodiments, an angle between the release trajectory 114 and the vertical axis 62 may be zero degrees, one degree, two degrees, five degrees, ten degrees, twenty degrees, or other suitable angles. As used herein, "vacuum" refers to an air pressure that is less than the ambient atmospheric air pressure, and not necessarily 0 pa.

The particle delivery system 40 includes a first disc housing 120 and a second disc housing 122. The first particle disc 82 is disposed within and configured to rotate within the first disc housing 120. The second particle disc 84 is disposed and configured to rotate within the second disc housing 122. The first vacuum passage 110 of the particle metering and singulation unit 44 is formed within the first disc housing 120. Additionally, the particle metering and singulation unit 44 includes the first particle disc 82 and the first disc housing 120. Additionally, the particle hopper 92 (e.g., the particle storage area) is formed within the first disc housing 120.

As illustrated, the particle delivery system 40 includes a particle transfer assembly 130 having a particle tube 131 extending generally from the release point 96 to an engagement point 132 of the second particle disc 84. The particle tube 131 of the particle transfer assembly 130 is coupled to the first disc housing 120 and the second disc housing 122. The second particle disc 84 is configured to receive each particle 80 at the engagement point 132. The particle transfer assembly 130 is configured to at least partially direct the particles 80 from the first particle disc 82 (e.g., from the release point 96 of the first particle disc 82) to the second particle disc 84 (e.g., to the engagement point 132 of the second particle disc 84) along the release trajectory 114. In certain embodiments, the particle transfer assembly may be omitted, such that the particles flow from the release point to the engagement point without the particle transfer assembly. The particle tube may include any suitable shape and/or configuration configured to at least particle direct the particles, such as a channel, a cylindrical tube, a rectangular tube, and/or other suitable shapes/configurations.

The second particle disc 84 has apertures 134 configured to receive the particles 80 at the engagement point 132. For example, each aperture 134 may receive a single particle 80. The second particle disc 84 is configured to rotate, as indicated by arrow 136, to move the particles 80 from the engagement point 132 to a release point 138 of the second particle disc 84, where the particles 80 are released along a release trajectory 140 toward the trench 31.

The air flow system 100 is configured to reduce the air pressure within a second vacuum passage 150 positioned along a portion of the second particle disc 84, thereby drawing the particles 80 toward and into the apertures 134 at the engagement point 132. As illustrated, the third air tube 108 is fluidly coupled to the air flow device 102 and to the second vacuum passage 150 formed within the second disc housing 122. The air flow device 102 is configured to draw air through the apertures 134 while the apertures 134 are aligned with the second vacuum passage 150. As the second particle disc 84 rotates, the vacuum formed at the apertures 134 secures the particles 80 to the second particle disc 84 at the apertures 134, such that the second particle disc 84 moves each particle 80 from the engagement point 132 to the release point 138. At the release point 96, the second vacuum passage 150 ends (e.g., the vacuum is removed, terminated, and/or occluded), and the particles 80 are released from the apertures 134 of the second particle disc 84 along the release trajectory 140. In certain embodiments, in addition to or in place of removing the vacuum (e.g., the second vacuum passage ending), the air flow system may be configured to remove the particles from the particle disc via an air flow. The air flow system may be configured to accelerate the particles from the second particle disc toward the trench as the particles are removed from the second particle disc. In certain embodiments, the particle delivery system may include a first air flow device (e.g., a first vacuum source) configured to form the vacuum along the first vacuum passage to secure the particles to the first particle disc, and a second air flow device (e.g., a second vacuum source) configured to form the vacuum along the second vacuum passage to secure the particles to the second particle disc.

As described above, the first particle disc 82 is configured to meter the particles 80 and to provide a spacing between the particles 80. The spacing between the particles 80 when disposed within the trench 31 may enhance plant development and/or yield. Additionally, the particle delivery system 40 is configured to accelerate the particles 80 generally toward and along the trench 31. The acceleration of the particles 80 by the particle delivery system 40 may enable the row unit to travel faster than traditional row units that utilize seed tubes, which rely solely on gravity to accelerate the particles 80 for delivery to soil. For example, the particle delivery system 40 may achieve higher application rates of the particles 80 compared to traditional row units, thereby enabling the row unit having the particle delivery system 40 to travel faster than traditional row units. The particle delivery system 40 is configured to accelerate the particles 80 via the air flow system 100, gravity, and the second particle disc 84. For example, the air flow system 100 is configured to provide the air flow 112 from the second air tube 106 to accelerate the particles 80 downwardly along the release trajectory 114. For example, the air flow system 100 may apply a force to the particles 80 via the air flow 112. Additionally, the particle delivery system 40 is configured to enable the particles 80 to accelerate under the influence of gravity as the particles 80 travel between the first particle disc 82 and the second particle disc 84. The second particle disc 84 is configured to accelerate the particles 80 received from the first particle disc 82, such that a particle exit speed of the particles 80 expelled from the second particle disc 84 along the release trajectory 140 reaches a target particle exit speed. The particle exit speed of the particles 80 may reach the target particle exit speed when the particle exit speed is equal to the target particle exit speed, when the particle exit speed passes (e.g., is greater than or less than) the target particle exit speed, when the particle exit speed is within a threshold value of the target particle exit speed, or a combination thereof.

In certain embodiments, the second particle disc 84 is configured to rotate faster than the first particle disc 82 to accelerate the particles 80. For example, the first particle disc 82 may rotate at a first speed (e.g., a first tangential velocity of the first particle disc 82 at the apertures 90), and the second particle disc 84 may rotate at a second speed (e.g., a second tangential velocity of the second particle disc 84 at the apertures 134) faster than the first speed. The faster speed the second particle disc 84 may accelerate the particles 80 to the target particle exit speed as the particles 80 are released from the second particle disc 84.

In some embodiments, the second particle disc 84 may have a larger radius than the first particle disc 82. As used herein, radius refers to the radial distance from a center of a particle disc to the apertures of the particle disc. For example, a first radius of the first particle disc 82 may be a radial distance between a center of the first particle disc 82 and the apertures 90, and a second radius of the second particle disc 84 may be a radial distance between a center of the second particle disc 84 and the apertures 134. The larger radius of the second particle disc 84 may accelerate the particles 80 (e.g., even if the first and second particle discs are rotating at the same rotational speed). For example, the tangential velocity of the second particle disc 84 at the apertures 134 may be greater than the tangential velocity of the first particle disc 82 at the apertures 90, because a radial distance of the apertures 134 is greater than a radial distance of the apertures 90.

In certain embodiments, the particle delivery system may include additional particle discs (e.g., in addition to the first particle disc 82 and the second particle disc 84) configured to accelerate the particles toward and/or along the trench. Each particle disc (from the particle disc adjacent to the hopper to the particle disc adjacent to the trench) may rotate progressively faster and/or may have progressively larger radii, such that each progressive particle disc imparts a greater velocity on each particle as the particle is released from the respective particle disc.

The particle delivery system 40 includes a controller 170 configured to control the rotation rate (e.g., the rotational speed) of the first particle disc 82 to adjust/control the spacing between the particles 80. For example, the controller 170 may control a motor 171, which is configured to drive rotation of the first particle disc 82, to adjust/control the rotation rate of the first particle disc 82 (e.g., by outputting an output signal to the motor 171 indicative of instructions to adjust the rotation rate of the first particle disc 82). Additionally, the controller 170 may control the motor 171 to achieve a target spacing between the particles 80. The controller 170 may determine the target spacing between the particles 80 based on a type of the particles 80, an input received from a user interface, and/or a ground speed of the row unit. The spacing may be any suitable spacing, such as one centimeter, two centimeters, five centimeters, ten centimeters, fifty centimeters, one meter, two meters, five meters, etc. In certain embodiments, the controller 170 may control the rotation rate of the first particle disc 82 (e.g., via control of the motor 171) to achieve the target spacing based on a reference table identifying rotational speeds of the first particle disc 82 that will achieve particular spacings, based on an empirical formula, in response to sensor feedback, or a combination thereof.

Additionally, the controller 170 is configured to control the rotation rate (e.g., rotational speed) of the second particle disc 84 to adjust/control the particle exit speed of the particles 80 expelled from the second particle disc 84 (e.g., from the release point 138 of the second particle disc 84, along the release trajectory 140, and toward and/or along the trench 31), such that the particle exit speed reaches a target particle exit speed. For example, the controller 170 may control a motor 173, which is configured to drive rotation of the second particle disc 84, to adjust/control the rotation rate of the second particle disc 84 (e.g., by outputting an output signal to the motor 173 indicative of instructions to adjust the rotation rate of the second particle disc 84), thereby enabling the controller 170 to adjust/control the particle exit speed of the particles 80. The controller 170 may control the particle exit speed of the particles 80, such that the particle exit speed reaches the target particle exit speed. The controller 170 may determine the target particle exit speed of the particles 80 based on the type of the particles 80, an input received from a user interface, and/or the ground speed of the row unit. The target particle exit speed may be any suitable speed, such one kilometer per hour (kph), two kph, three kph, five kph, ten kph, fifteen kph, twenty kph, etc. In certain embodiments, the controller 170 may determine the target particle exit speed as a target percentage of the ground speed of the row unit (e.g., thirty percent, fifty percent, seventy percent, eighty percent, ninety percent, ninety-five percent, one hundred percent, etc.).

To control the rotation rate of the second particle disc 84, the controller 170 may receive an input signal indicative of the particle exit speed of the particle 80 at the release point 138 of the second particle disc 84. For example, the controller 170 may receive the input signal from a particle sensor 176 of the particle delivery system 40 disposed adjacent to the release point 138 and along the release trajectory 140. The particle exit speed may be a particle exit speed of one or more particles 80 (e.g., an mean, a median, a minimum, or a maximum of particle exit speeds of the one or more particles 80). The particle sensor 176 may include an infrared sensor or another suitable type of sensor configured to output the input signal indicative of the particle exit speed of each particle 80 at the release point 138. The particle sensor 176 may be positioned a fixed distance from the release point 138 of the second particle disc 84, such that the controller 170 may determine the particle exit speed of the particle 80 at the release point 138 based on the fixed distance and the input signal indicative of the particle exit speed received from the particle sensor 176 (e.g., based on deceleration of the particle 80 traveling the fixed distance).

The controller 170 may compare the particle exit speed of the particle 80 at the release point 138 of the second particle disc 84 to the target particle exit speed to determine whether a difference between the particle exit speed and the target particle exit speed exceeds a threshold value. In response to determining that the particle exit speed at the release point 138 of the second particle disc 84 is less than the target particle exit speed and the difference between the particle exit speed and the target particle exit speed exceeds the threshold value, the controller 170 may output an output signal indicative of instructions to increase the rotation rate of the second particle disc 84. For example, the controller 170 may output the output signal to the motor 173 to cause the motor 173 to increase the rotation rate of the second particle disc 84. The increase in the rotation rate of the second particle disc 84 may increase the particle exit speed, such that the particle exit speed reaches the target particle exit speed (e.g., such that the difference between the particle exit speed and the target particle exit speed is less than the threshold value).

In response to determining that the particle exit speed at the release point 138 of the second particle disc 84 is greater than the target particle exit speed and the difference between the particle exit speed and the target particle exit speed exceeds the threshold value, the controller 170 may output an output signal indicative of instructions to decrease the rotation rate of the second particle disc 84. For example, the controller 170 may output the output signal to the motor 173 to cause the motor 173 to decrease the rotation rate of the second particle disc 84. The decrease in the rotation rate of the second particle disc 84 may decrease the particle exit speed, such that the particle exit speed reaches the target particle exit speed (e.g., such that the difference between the particle exit speed and the target particle exit speed is less than the threshold value).

In certain embodiments, the controller 170 is configured to control the air flow 112 provided by the air flow system 100 to adjust/control a particle transfer speed of each particle 80 expelled from the first particle disc 82 (e.g., from the release point 96 of the first particle disc 82, along the release trajectory 114, and toward the engagement point 132 of the second particle disc 84), such that the particle transfer speed reaches a target particle transfer speed at the engagement point 132 of the second particle disc 84. For example, the controller 170 may control the air flow device 102, which is configured to provide the air flow 112 to accelerate each particle 80 along the release trajectory 114. The controller 170 may determine the target particle transfer speed of the particles 80 based on the rotation rate of the second particle disc 84 and/or the type of the particles 80. The target particle transfer speed may be any suitable speed, such one-tenth kph, one-half kph, one kph, two kph, three kph, five kph, ten kph, fifteen kph, twenty kph, etc. In certain embodiments, the controller 170 may determine the target particle transfer speed as a target percentage of the rotation rate of the second particle disc 84 (e.g., thirty percent, fifty percent, seventy percent, eighty percent, ninety percent, ninety-five percent, one hundred percent, etc.).

To control the air flow 112 provided by the air flow system 100, the controller 170 may receive an input signal indicative of the particle transfer speed of the particle 80 at the engagement point 132 of the second particle disc 84. For example, the controller 170 may receive the input signal from a particle sensor 178 of the particle delivery system 40 disposed within the particle transfer assembly 130. The particle transfer speed may be a particle transfer speed of one or more particles 80 (e.g., an mean, a median, a minimum, or a maximum of particle transfer speeds of the one or more particles 80). The particle sensor 178 may include an infrared sensor or another suitable type of sensor configured to output the input signal indicative of the particle transfer speed of each particle 80 at the engagement point 132. The particle sensor 178 may be positioned a fixed distance from the engagement point 132 of the second particle disc 84, such that the controller 170 may determine the particle transfer speed of the particle 80 at the engagement point 132 based on the fixed distance and the input signal indicative of the particle transfer speed received from the particle sensor 178 (e.g., based on gravitational acceleration of the particle 80 traveling the fixed distance from the particle sensor 178 to the engagement point 132 of the second particle disc 84).

The controller 170 may compare the particle transfer speed of the particle 80 at the engagement point 132 of the second particle disc 84 to the target particle transfer speed to determine whether a difference between the particle transfer speed and the target particle transfer speed exceeds a threshold value. In response to determining that the particle transfer speed at the engagement point 132 of the second particle disc 84 is less than the target particle transfer speed and the difference between the particle transfer speed and the target particle transfer speed exceeds the threshold value, the controller 170 may output an output signal indicative of instructions to increase the flow rate of the air flow 112 provided by the air flow system 100 from the second air tube 106. For example, the controller 170 may output the output signal to the air flow device 102 to cause the air flow device 102 to increase the flow rate of the air flow 112. The increase in the air flow rate may increase the particle transfer speed, such that the particle transfer speed reaches the target particle transfer speed (e.g., such that the difference between the particle transfer speed and the target particle transfer speed is less than the threshold value).

In response to determining that the particle transfer speed at the engagement point 132 of the second particle disc 84 is greater than the target particle transfer speed and the difference between the particle transfer speed and the target particle transfer speed exceeds the threshold value, the controller 170 may output an output signal indicative of instructions to decrease the flow rate of the air flow 112 provided by the air flow system 100. For example, the controller 170 may output the output signal to the air flow device 102 to cause the air flow device 102 to decrease the flow rate of the air flow 112. The decrease in the air flow rate may decrease the particle transfer speed, such that the particle transfer speed reaches the target particle transfer speed (e.g., such that the difference between the particle transfer speed and the target particle transfer speed is less than the threshold value).

As illustrated, the controller 170 of the particle delivery system 40 includes a processor 190 and a memory 192. The processor 190 (e.g., a microprocessor) may be used to execute software, such as software stored in the memory 192 for controlling the particle delivery system 40 (e.g., for controlling rotational speeds of the first particle disc 82 and the second particle disc 84, and the air flow 112 provided by the air flow system 100). Moreover, the processor 190 may include multiple microprocessors, one or more "general-purpose" microprocessors, one or more special-purpose microprocessors, and/or one or more application specific integrated circuits (ASICS), or some combination thereof. For example, the processor 190 may include one or more reduced instruction set (RISC) or complex instruction set (CISC) processors.

The memory device 192 may include a volatile memory, such as random access memory (RAM), and/or a nonvolatile memory, such as read-only memory (ROM). The memory device 192 may store a variety of information and may be used for various purposes. For example, the memory device 192 may store processor-executable instructions (e.g., firmware or software) for the processor 190 to execute, such as instructions for controlling the particle delivery system 40. In certain embodiments, the controller 170 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., the target particle exit speed), instructions (e.g., software or firmware for controlling the particle delivery system 40), and any other suitable data. The processor 190 and/or the memory device 192, and/or an additional processor and/or memory device, may be located in any suitable portion of the system. For example, a memory device for storing instructions (e.g., software or firmware for controlling portions of the particle delivery system 40) may be located in or associated with the particle delivery system 40.

Additionally, the particle delivery system 40 includes a user interface 194 is communicatively coupled to the controller 170. The user interface 194 may be configured to inform an operator of the particle exit speed of the particles 80, to enable the operator to adjust the rotational speed of the first particle disc 82 and/or the spacing between the particles 80, to enable the operator to adjust the rotational speed of the second particle disc 84 and/or the air flow 112 provided by the air flow system 100, to provide the operator with selectable options of the type of particles 80, and to enable other operator interactions. For example, the user interface 194 may include a display and/or other user interaction devices (e.g., buttons) configured to enable operator interactions.

Figure 4:
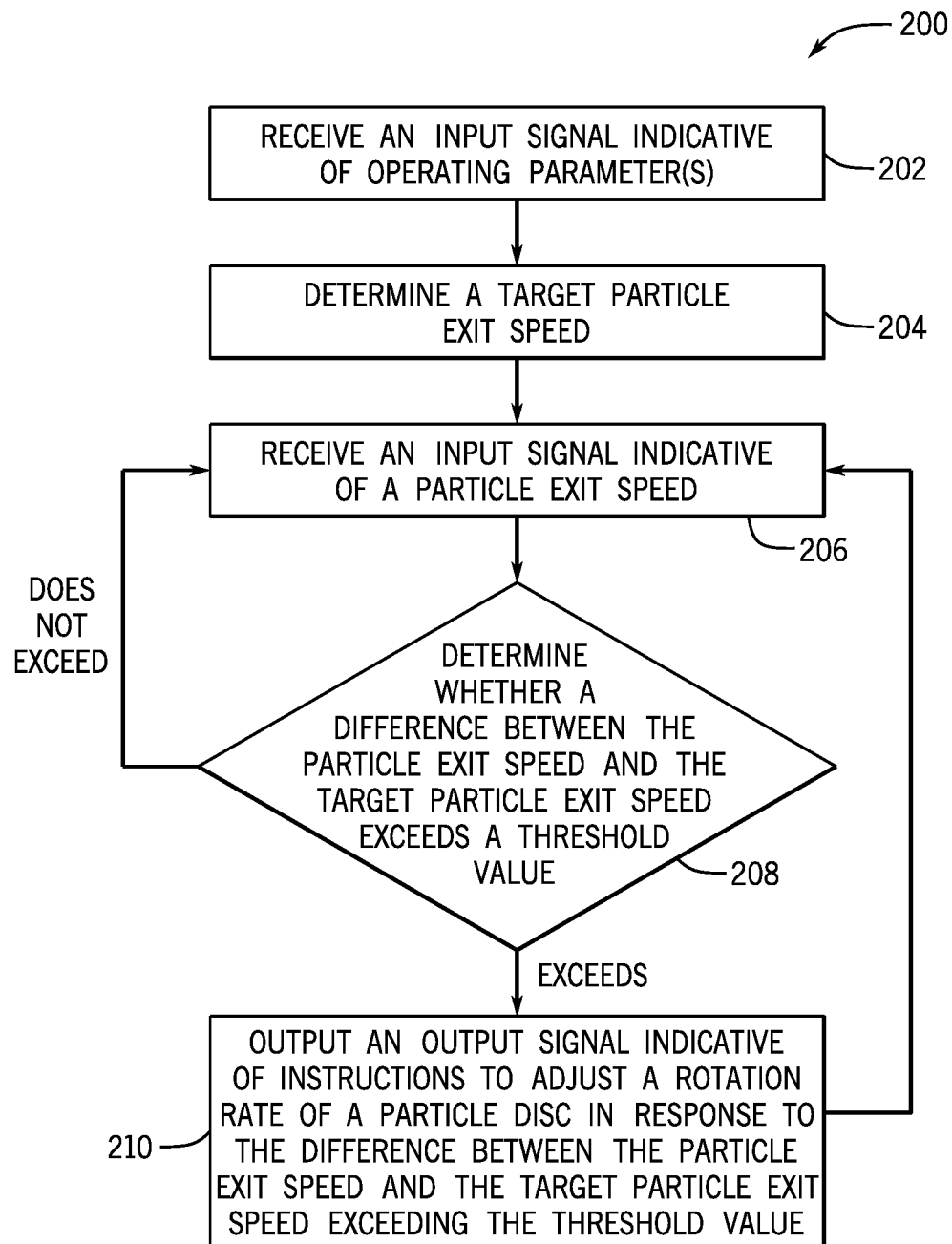
FIG. 4 is a flow diagram of an embodiment of a process for controlling a particle delivery system, in accordance with an aspect of the present disclosure.

FIG. 4 is a flow diagram of an embodiment of a process 200 for controlling the particle delivery system. The process 200, or portions thereof, may be performed by the controller of the particle delivery system. The process 200 begins at block 202, in which an input signal indicative of operating parameter(s) is received. For example, the operating parameters may include the type of the particles, the ground speed of the row unit, a radius of one or more particle discs, a spacing between apertures of one or more particle discs, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 204, the target particle exit speed is determined. For example, the controller may determine the target particle exit speed of the particles based on the type of the particles, the ground speed of the row unit, other operating parameter(s) received at block 202, or a combination thereof. At block 206, an input signal indicative of the particle exit speed of the particle at the release point of the second particle disc is received. For example, the controller may receive the input signal indicative of the particle exit speed from the particle sensor disposed adjacent to the release point of the second particle disc. In certain embodiments, the controller may receive multiple input signals from the particle sensor, in which each input signal is indicative of a particle exit speed of a respective particle. The controller may determine an average of the multiple particle exit speeds to determine the average particle exit speed of the particles at the release point. As such, the controller may account for variance among the particle exit speeds of multiple particles at the release point to reduce excessive control actions (e.g., adjustments to the rotation rate of the second particle disc).

At block 208, a determination of whether a difference between the particle exit speed and the target particle exit speed exceeds a threshold value is made (e.g., by the controller). Additionally, a determination of whether the particle exit speed is less than or greater than the target particle exit speed is made (e.g., by the controller). The threshold value may be determined based on the type of the particles, the ground speed of the row unit, and/or other factors. In response to the difference exceeding the threshold, the process 200 proceeds to block 210. In response to the difference not exceeding the threshold, the process 200 returns to block 206 and receives the next input signal indicative of the particle exit speed.

At block 210, in response to the difference between the particle exit speed and the target particle exit speed exceeding the threshold value, an output signal indicative of instructions to adjust the rotation rate of the second particle disc is output to the motor coupled to and configured to drive rotation of the second particle disc. For example, the controller may output the output signal indicative of instructions to increase the rotation rate of the second particle disc based on a determination that the particle exit speed is less than the target particle exit speed and the difference between the particle exit speed and the target particle exit speed exceeds the threshold value. Further, the controller may output the output signal indicative of instructions to decrease the rotation rate of the second particle disc based on a determination that the particle exit speed is greater than the target particle exit speed and the difference between the particle exit speed and the target particle exit speed exceeds the threshold value.

After completing block 210, the process 200 returns to block 206 and receives the next input signal indicative of the particle exit speed of the particle at the release point of the second particle disc. The next determination is made of whether the difference between the particle exit speed and the target particle exit speed exceeds the threshold value (e.g., block 208), and the rotation rate of the second particle disc is adjusted in response to the determination. As such, blocks 206-210 of the process 200 may be iteratively performed (e.g., by the controller of the particle delivery system and/or by another suitable controller) to facilitate acceleration of the particles to the target particle exit speed. In some embodiments, certain blocks of the blocks 202-210 may be omitted from the process 200, and/or the order of the blocks 202-210 may be different.

Figure 5:
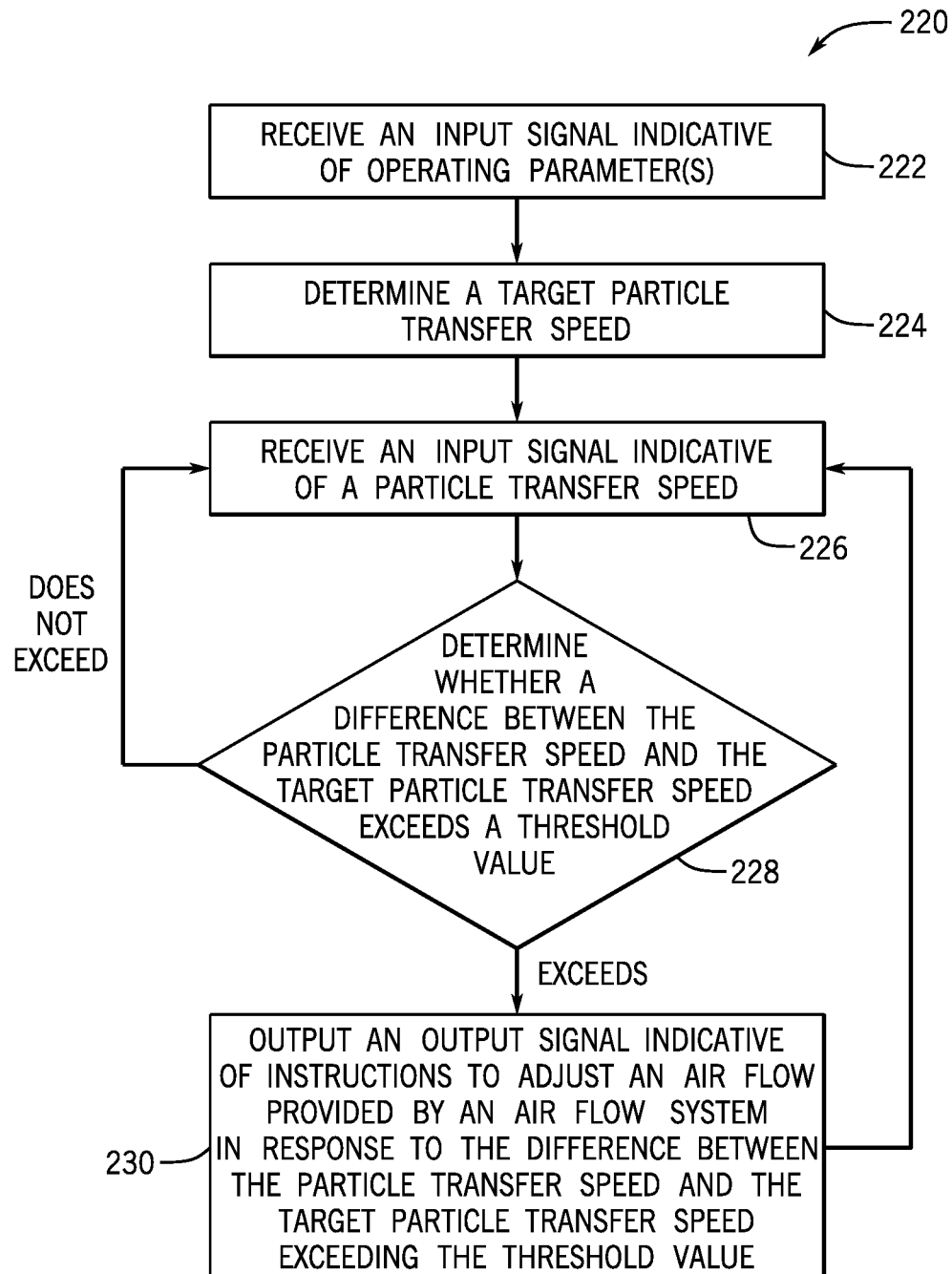
FIG. 5 is a flow diagram of an embodiment of a process for controlling a particle delivery system, in accordance with an aspect of the present disclosure.

FIG. 5 is a flow diagram of an embodiment of a process 220 for controlling the particle delivery system. The process 220, or portions thereof, may be performed by the controller of the particle delivery system. The process 220 begins at block 222, in which an input signal indicative of operating parameter(s) is received. For example, the operating parameters may include the type of the particles, the ground speed of the row unit, a radius of one or more particle discs, a spacing between apertures of one or more particle discs, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 224, the target particle transfer speed is determined. For example, the controller may determine the target particle transfer speed of the particles based on the type of the particles, the rotation rate of the second particle disc (e.g., the second particle disc having the engagement point configured to receive the particles traveling at the particle transfer speed), other operating parameter(s) received at block 222, or a combination thereof. At block 226, an input signal indicative of the particle transfer speed of the particle at the engagement point of the second particle disc is received. For example, the controller may receive the input signal indicative of the particle transfer speed from the particle sensor disposed adjacent to the engagement point of the second particle disc. In certain embodiments, the controller may receive multiple input signals from the particle sensor, in which each input signal is indicative of a particle transfer speed of a respective particle. The controller may determine an average of the multiple particle transfer speeds to determine the average particle transfer speed of the particles at the engagement point. As such, the controller may account for variance among the particle transfer speeds of multiple particles at the engagement point to reduce excessive control actions (e.g., adjustments to the air flow provided by the air flow system).

At block 228, a determination of whether a difference between the particle transfer speed and the target particle transfer speed exceeds a threshold value is made (e.g., by the controller). Additionally, a determination of whether the particle transfer speed is less than or greater than the target particle transfer speed is made (e.g., by the controller). The threshold value may be determined based on the type of the particles and/or the rotation rate of the second particle disc. In response to the difference exceeding the threshold, the process 220 proceeds to block 230. In response to the difference not exceeding the threshold, the process 220 returns to block 226 and receives the next input signal indicative of the particle transfer speed.

At block 230, in response to the difference between the particle transfer speed and the target particle transfer speed exceeding the threshold value, an output signal indicative of instructions to adjust the flow rate of the air flow is output to the air flow device configured to provide the air flow. For example, the controller may output the output signal indicative of instructions to increase the flow rate of the air flow provided by the air flow device (e.g., by the air flow device of the air flow system) based on a determination that the particle transfer speed is less than the target particle transfer speed and the difference between the particle transfer speed and the target particle transfer speed exceeds the threshold value. Further, the controller may output the output signal indicative of instructions to decrease the flow rate of the air flow provided by the air flow device based on a determination that the particle transfer speed is greater than the target particle transfer speed and the difference between the particle transfer speed and the target particle transfer speed exceeds the threshold value.

After completing block 230, the process 220 returns to block 226 and receives the next input signal indicative of the particle transfer speed of the particle at the engagement point of the second particle disc. The next determination is made of whether the difference between the particle transfer speed and the target particle transfer speed exceeds the threshold value (e.g., block 228), and the flow rate of the air flow provided by the air flow device is adjusted in response to the determination. As such, blocks 226-230 of the process 220 may be iteratively performed (e.g., by the controller of the particle delivery system and/or by another suitable controller) to facilitate acceleration of the particles to the target particle transfer speed and transfer of the particles between the first and second particle discs. In some embodiments, certain blocks of the blocks 222-230 may be omitted from the process 220, and/or the order of the blocks 222-230 may be different.

Figure 6:
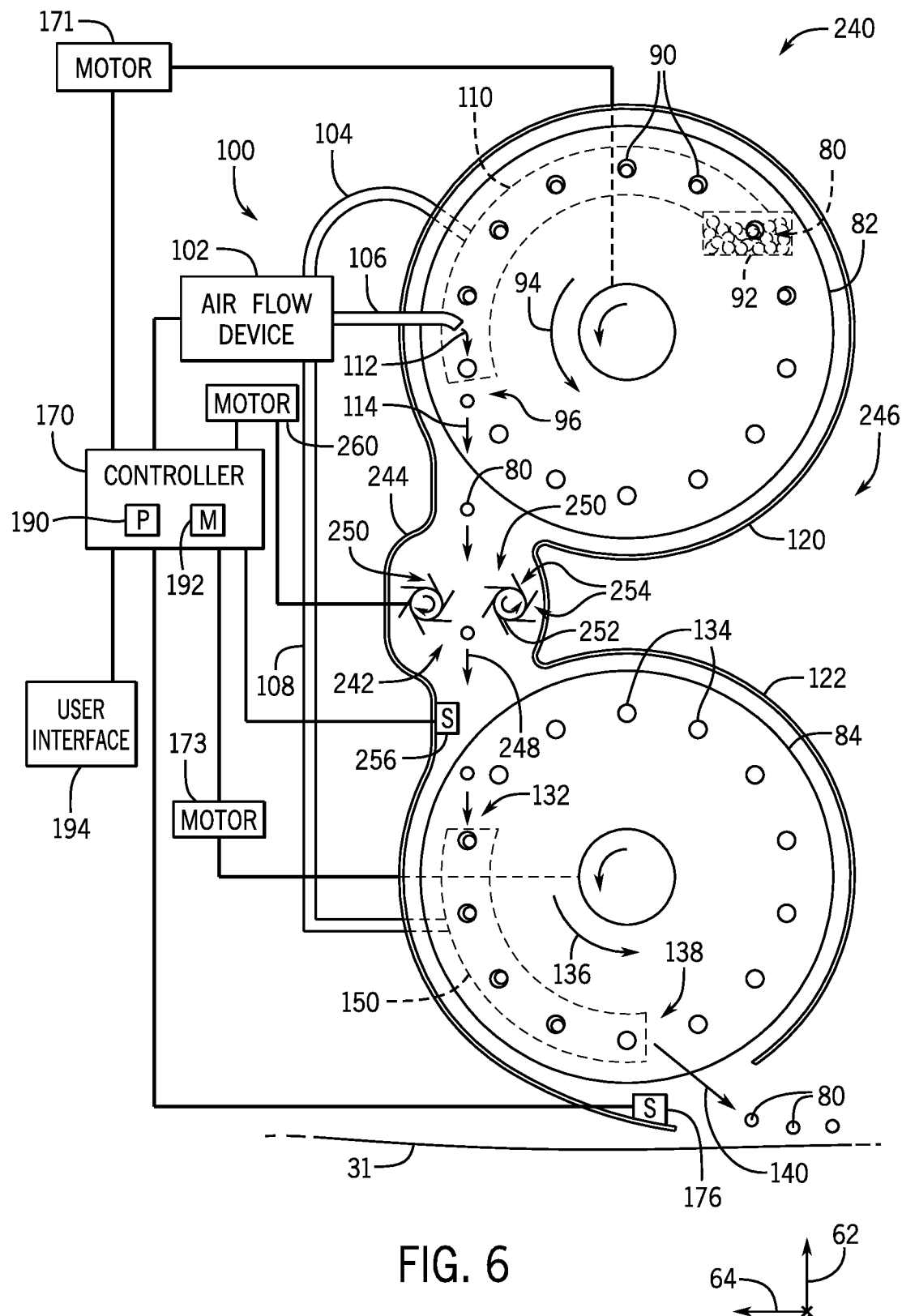
FIG. 6 is a side view of another embodiment of a particle delivery system that may be employed within the row unit of FIG. 2, in accordance with an aspect of the present disclosure.

FIG. 6 is a side view of another embodiment of a particle delivery system 240 that may be employed within the row unit of FIG. 2. As illustrated, the particle delivery system 240 includes the particle metering and singulation unit 44, which includes the first particle disc 82, configured to meter and establish the spacing between the particles 80. The particle delivery system 240 also includes the second particle disc 84 configured to receive the particles 80 from the first particle disc 82 and to expel the particles 80 into the trench 31. Additionally, the particle delivery system 240 includes the air flow system 100 configured to provide the vacuum along the first vacuum passage 110 adjacent to the first particle disc 82, to remove the particles 80 from the first particle disc 82 and accelerate the particles 80 along the release trajectory 114 via the air flow 112, and to provide the vacuum along the second vacuum passage 150 adjacent to the second particle disc 84.

The particle delivery system 240 includes a particle transfer assembly 242 disposed generally between the release point 96 of the first particle disc 82 and the engagement point 132 of the second particle disc 84. The particle transfer assembly 242 includes a particle transfer housing 244 coupled to the first disc housing 120 and to the second disc housing 122, such that the particle transfer housing 244, the first disc housing 120, and the second disc housing 122 form a particle delivery housing 246. The particle transfer assembly 242 is configured to accelerate and at least partially direct the particles 80 toward the second particle disc 84 (e.g., to the engagement point 132 of the second particle disc 84) along a transfer trajectory 248.

The particle transfer assembly 242 includes guide wheels 250 configured to rotate (e.g., in opposite directions) to drive the particles 80 downwardly along the transfer trajectory 248. For example, each guide wheel 250 includes a wheel base 252 (e.g., a wheel, a gear, etc.) and paddles 254 coupled to the wheel base 252. The wheel base 252 is configured to rotate to drive rotation of the paddles 254. The paddles 254 are configured to contact the particles 80 flowing between the guide wheels 250. As a paddle 254 contacts a respective particle 80, the paddle 254 directs the particle 80 along the transfer trajectory 248. Additionally, the paddles 254 are configured to accelerate the particles 80, such that the particle transfer speed of the particles 80 reaches the target particle transfer speed. The paddles 254 may be formed from a resilient and flexible material (e.g., rubber, plastic, fabric, other materials, or a combination thereof) that enables the paddles 254 to flex in response to contact with the particles 80 and/or in response to rotation of the guide wheels 250. In certain embodiments, the particle delivery system may include more or fewer guide wheels disposed generally between the particle discs and configured to guide and to accelerate the particles along the transfer trajectory (e.g., one guide wheel, three guide wheels, four guide wheels, six guide wheels, ten guide wheels, etc.). In some embodiments, the particle delivery system 240 may include both the air flow 112 and the particle transfer assembly 242 configured to progressively accelerate the particles 80. In other embodiments, the air flow 112 may be omitted from the particle delivery system 240.

In certain embodiments, the controller 170 is configured to control a rotation rate of the guide wheels 250 to adjust/control the particle transfer speed of the particles 80 along the transfer trajectory 248 and toward the engagement point 132 of the second particle disc 84, such that the particle transfer speed reaches a target particle transfer speed at the engagement point 132 of the second particle disc 84.

To control the rotation rate of the guide wheels 250, the controller 170 may receive an input signal indicative of the particle transfer speed of the particle 80 at the engagement point 132 of the second particle disc 84. For example, the controller 170 may receive the input signal from a particle sensor 256 of the particle delivery system 40 disposed within the particle transfer housing 244 adjacent to the particle transfer assembly 242. The particle sensor 256 may include an infrared sensor or another suitable type of sensor configured to output the input signal indicative of the particle transfer speed of each particle 80 at the engagement point 132. The particle sensor 256 may be positioned a fixed distance from the engagement point 132 of the second particle disc 84, such that the controller 170 may determine the particle transfer speed of the particle 80 at the engagement point 132 based on the fixed distance and the input signal indicative of the particle transfer speed received from the particle sensor 256 (e.g., based on gravitational acceleration of the particle 80 traveling the fixed distance from the particle sensor 256 to the engagement point 132 of the second particle disc 84).

The controller 170 may compare the particle transfer speed of the particle 80 at the engagement point 132 of the second particle disc 84 to the target particle transfer speed to determine whether a difference between the particle transfer speed and the target particle transfer speed exceeds a threshold value. In response to determining that the particle transfer speed at the engagement point 132 of the second particle disc 84 is less than the target particle transfer speed and the difference between the particle transfer speed and the target particle transfer speed exceeds the threshold value, the controller 170 may output an output signal indicative of instructions to increase the rotation rate of the guide wheels 250. For example, the controller 170 may output the output signal to a motor 260 of the particle delivery system 240 coupled to and configured to drive rotation of the wheel base 252 of each guide wheel 250 to cause the motor 260 to increase the rotation rate of each guide wheel 250. The increase in the rotation rate of the guide wheels 250 may increase the particle transfer speed, such that the particle transfer speed reaches the target particle transfer speed (e.g., such that the difference between the particle transfer speed and the target particle transfer speed is less than the threshold value).

In response to determining that the particle transfer speed at the engagement point 132 of the second particle disc 84 is greater than the target particle transfer speed and the difference between the particle transfer speed and the target particle transfer speed exceeds the threshold value, the controller 170 may output an output signal indicative of instructions to decrease the rotation rate of the guide wheels 250. For example, the controller 170 may output the output signal to the motor 260 of the particle delivery system 240 to cause the motor 260 to decrease the rotation rate of each guide wheel 250. The decrease in the rotation rate of the guide wheels 250 may decrease the particle transfer speed, such that the particle transfer speed reaches the target particle transfer speed (e.g., such that the difference between the particle transfer speed and the target particle transfer speed is less than the threshold value). In certain embodiments, the controller 170 may control both the air flow 112 and the rotation rate of the guide wheels 250 to progressively accelerate the particles 80, such that the particle transfer speed reach the target particle transfer speed. In other embodiments, the air flow 112 may omitted, and the controller 170 may control the rotation rate of the guide wheels 250 to accelerate the particles 80.

Figure 7:
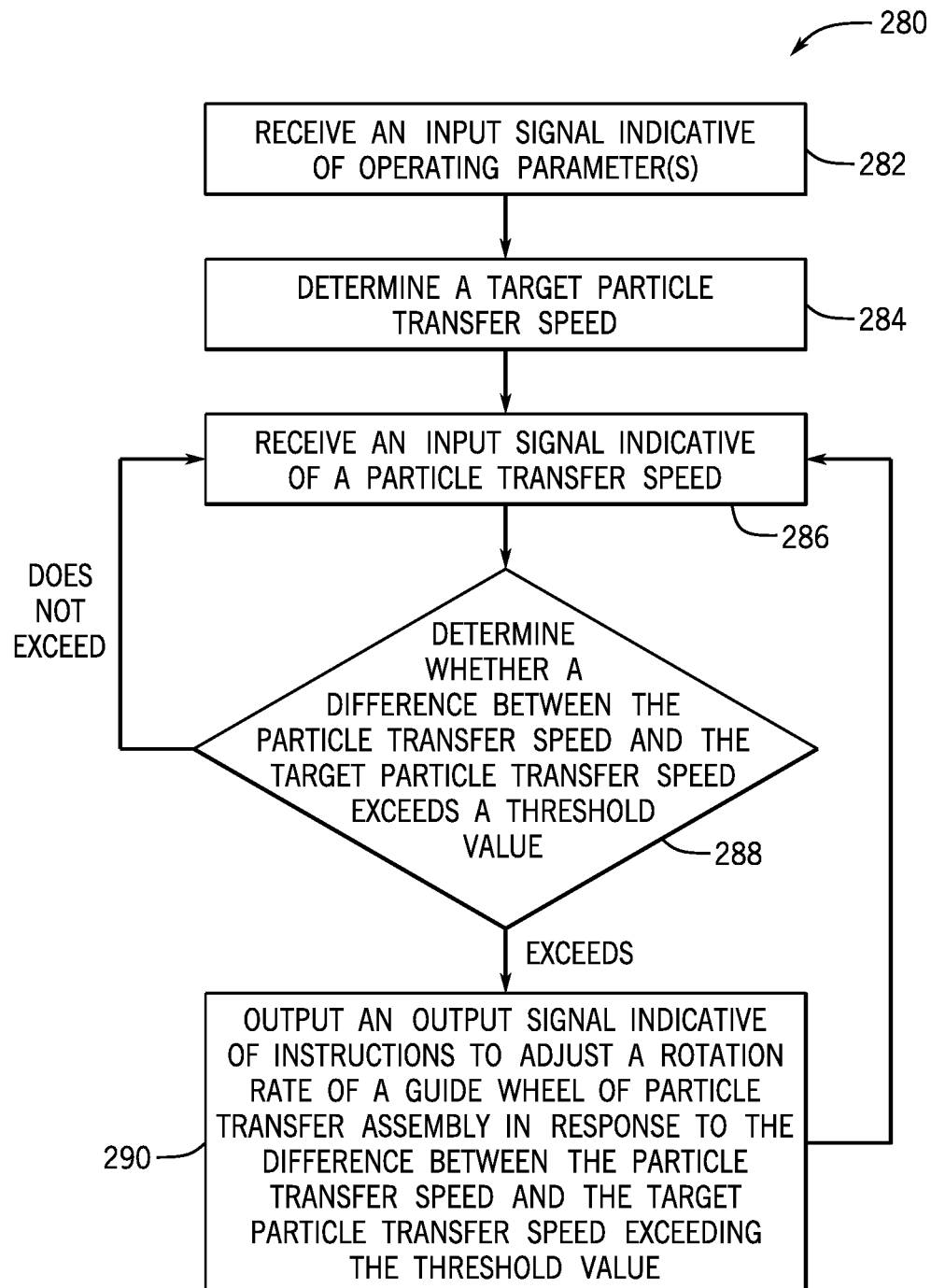
FIG. 7 is a flow diagram of a further embodiment of a process for controlling a particle delivery system, in accordance with an aspect of the present disclosure.

FIG. 7 is a flow diagram of a further embodiment of a process 280 for controlling the particle delivery system. The process 280, or portions thereof, may be performed by the controller of the particle delivery system. The process 280 begins at block 282, in which an input signal indicative of operating parameter(s) is received. For example, the operating parameters may include the type of the particles, the ground speed of the row unit, a radius of one or more particle discs, a spacing between apertures of one or more particle discs, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 284, the target particle transfer speed is determined. For example, the controller may determine the target particle transfer speed of the particles based on the type of the particles, the rotation rate of the second particle disc (e.g., the second particle disc having the engagement point configured to receive the particles traveling at the particle transfer speed), other operating parameter(s) received at block 282, or a combination thereof. At block 286, an input signal indicative of the particle transfer speed of the particle at the engagement point of the second particle disc is received. For example, the controller may receive the input signal indicative of the particle transfer speed from the particle sensor disposed adjacent to the engagement point of the second particle disc. In certain embodiments, the controller may receive multiple input signals from the particle sensor, in which each input signal is indicative of a particle transfer speed of a respective particle. The controller may determine an average of the multiple particle transfer speeds to determine the average particle transfer speed of the particles at the engagement point. As such, the controller may account for variance among the particle transfer speeds of multiple particles at the engagement point to reduce excessive control actions (e.g., adjustments to the air flow provided by the air flow system).

At block 288, a determination of whether a difference between the particle transfer speed and the target particle transfer speed exceeds a threshold value is made (e.g., by the controller). Additionally, a determination of whether the particle transfer speed is less than or greater than the target particle transfer speed is made (e.g., by the controller). The threshold value may be determined based on the type of the particles and/or the rotation rate of the second particle disc. In response to the difference exceeding the threshold, the process 280 proceeds to block 290. In response to the difference not exceeding the threshold, the process 280 returns to block 286 and receives the next input signal indicative of the particle transfer speed.

At block 290, in response to the difference between the particle transfer speed and the target particle transfer speed exceeding the threshold value, an output signal indicative of instructions to adjust the rotation rate of the guide wheels is output to the motor coupled to and configured to drive rotation of the guide wheels. For example, the controller may output the output signal indicative of instructions to increase the rotation rate of the guide wheels based on a determination that the particle transfer speed is less than the target particle transfer speed and the difference between the particle transfer speed and the target particle transfer speed exceeds the threshold value. Further, the controller may output the output signal indicative of instructions to decrease the rotation rate of the guide wheels based on a determination that the particle transfer speed is greater than the target particle transfer speed and the difference between the particle transfer speed and the target particle transfer speed exceeds the threshold value.

After completing block 290, the process 280 returns to block 286 and receives the next input signal indicative of the particle transfer speed of the particle at the engagement point of the second particle disc. The next determination is made of whether the difference between the particle transfer speed and the target particle transfer speed exceeds the threshold value (e.g., block 288), and the rotation rate of the guide wheels is adjusted in response to the determination. As such, blocks 286-290 of the process 280 may be iteratively performed (e.g., by the controller of the particle delivery system and/or by another suitable controller) to facilitate acceleration of the particles to the target particle transfer speed and transfer of the particles between the first and second particle discs. In some embodiments, certain blocks of the blocks 282-290 may be omitted from the process 280, and/or the order of the blocks 282-290 may be different.

Figure 8:
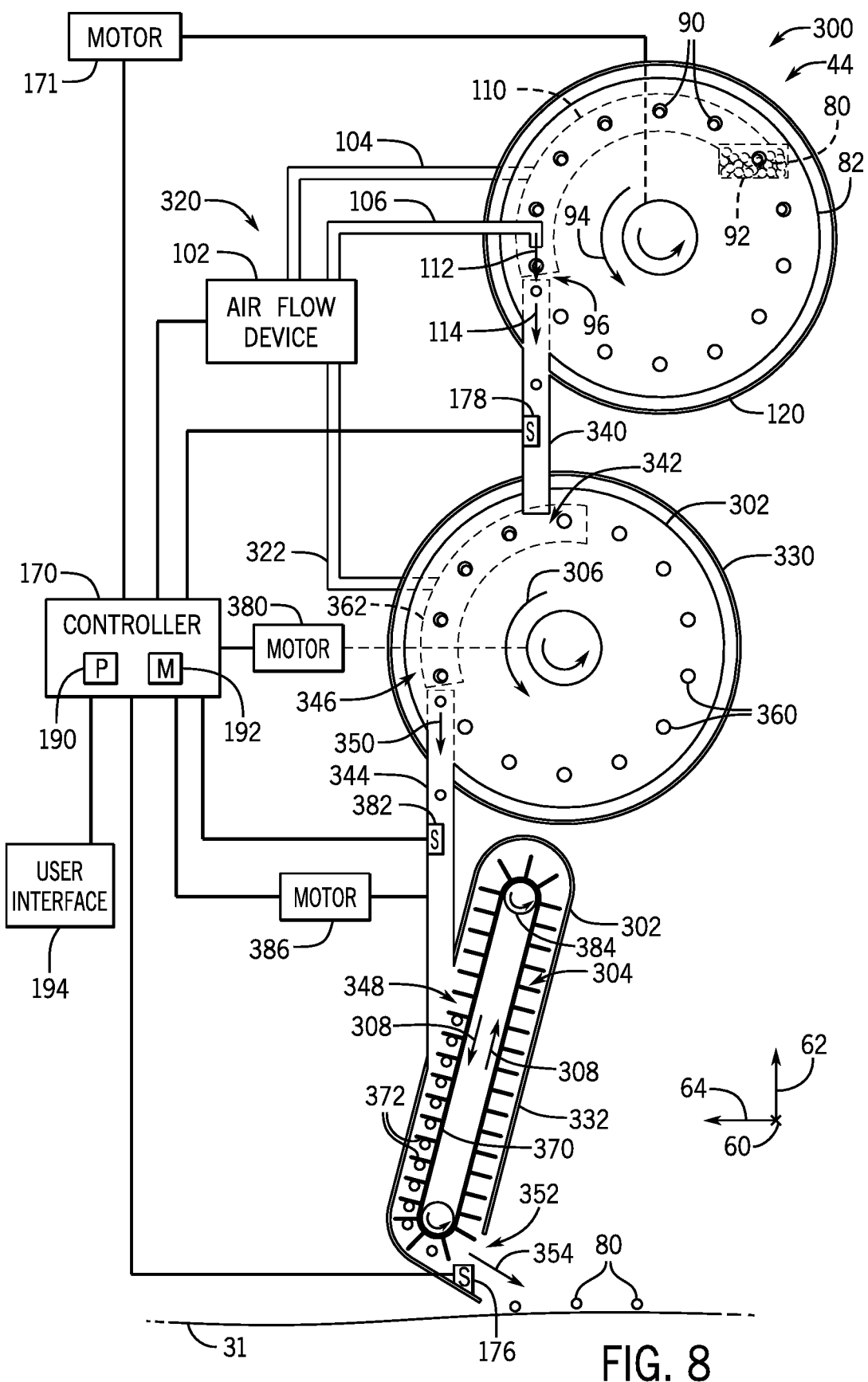
FIG. 8 is a side view of an embodiment of a particle delivery system that may be employed within the row unit of FIG. 2, in accordance with an aspect of the present disclosure.

FIG. 8 is a side view of an embodiment of a particle delivery system 300 that may be employed within the row unit of FIG. 2. As illustrated, the particle delivery system 300 includes the particle metering and singulation unit 44, which includes the first particle disc 82, configured to meter and establish the spacing between the particles 80. The particle delivery system 300 also includes a second particle disc 302 configured to accelerate and move the particles 80 to a particle belt 304, and the particle belt 304 configured to accelerate and move the particles 80 toward the trench 31. The second particle disc 302 is configured to rotate, as indicated by arrow 306, to move the particles 80 to the particle belt 304. The particle belt 304 is configured to rotate, as indicated by arrows 308, to expel the particles 80 into the trench 31.

As illustrated, the particle delivery system 300 includes an air flow system 320 having the air flow device 102, the first air tube 104 fluidly coupled to the air flow device 102, the second air tube 106 fluidly coupled to the air flow device 102, and a third air tube 322 fluidly coupled to the air flow device 102. The air flow system 320 is configured to reduce the air pressure within the first vacuum passage 110 positioned along a portion of the first particle disc 82, thereby drawing the particles 80 from the particle hopper 92 toward and against the apertures 90. As described above, the first air tube 104 is fluidly coupled to the air flow device 102 and to the first vacuum passage 110, such that the air flow device 102 is configured to draw air through the apertures 90, via the first air tube 104, while the apertures 90 are aligned with the first vacuum passage 110. At the release point 96, the air flow system 320 provides, via the second air tube 106, the first air flow 112 configured to remove each particle 80 from the respective aperture 90 (e.g., by overcoming the vacuum formed at the apertures 90. The particles 80 are released from the first particle disc 82 along the release trajectory 114. Rotation of the first particle disc 82 imparts a velocity on the particles along the release trajectory 114, and the particles 80 accelerate downwardly along the release trajectory 114 under the influence of gravity.

The particle delivery system 300 includes the first disc housing 120, a second disc housing 330, and a belt housing 332. The first particle disc 82 is disposed within and configured to rotate within the first disc housing 120. The second particle disc 302 is disposed within and configured to rotate within the second disc housing 330. The particle belt 304 is disposed within and configured to rotate within the belt housing 332.

The particle delivery system 300 includes a first particle tube 340 coupled to the first disc housing 120 and the second disc housing 330. The first particle tube 340 extends generally from the release point 96 to an engagement point 342 (e.g., a first engagement point) of the second particle disc 302 and is configured to at least partially direct the particles 80 from the first particle disc 82 (e.g., from the release point 96 of the first particle disc 82) to the second particle disc 302 (e.g., to the engagement point 342) along the release trajectory 114. Additionally, the particle delivery system 300 includes a second particle tube 344 coupled to the second disc housing 330 and the belt housing 332. The first particle tube 340 extends generally from a release point 346 (e.g., a second release point) of the second particle disc 302 to a particle engagement section 348 of the particle belt 304 and is configured to at least partially direct the particles 80 from the second particle disc 302 (e.g., from the release point 346) to the particle belt 304 (e.g., to the particle engagement section 348) along a transfer trajectory 350. The particle belt is configured to expel the particles 80 from a particle exit section 352 of the particle belt 304 along a release trajectory 354 into the trench 31. In certain embodiments, the first particle tube may be omitted, such that the particles flow from the release point of the first particle disc to the engagement point of the second particle disc, and/or the second particle disc may be omitted, such that the particles flow from the release point of the second particle disc to the particle engagement section of the particle belt.

The second particle disc 302 has apertures 360 configured to receive the particles 80 at the engagement point 342 of the second particle disc 302. For example, each aperture 360 may receive a single particle 80. The air flow system 320 is configured to reduce the air pressure within a second vacuum passage 362 positioned along a portion of the second particle disc 302, thereby drawing the particles 80 toward and into the apertures 360 at the engagement point 342. As illustrated, the third air tube 322 is fluidly coupled to the air flow device 102 and to the second vacuum passage 362 formed within the second disc housing 330. The air flow device 102 is configured to draw air through the apertures 360 while the apertures 360 are aligned with the second vacuum passage 362. As the second particle disc 302 rotates, the vacuum formed at the apertures 360 secures the particles 80 to the second particle disc 302 at the apertures 360, such that the second particle disc 302 moves each particle 80 from the engagement point 342 to the release point 346. At the release point 346, the second vacuum passage 362 ends (e.g., the vacuum is removed, terminated, and/or occluded), and the particles 80 are released from the apertures 360 of the second particle disc 302 along the transfer trajectory 350. In certain embodiments, in addition to or in place of removing the vacuum (e.g., the second vacuum passage ending), the air flow system may be configured to remove the particles from the particle disc via an air flow. The air flow system may be configured to accelerate the particles from the second particle disc toward the particle belt as the particles are removed from the second particle disc. In certain embodiments, the particle delivery system may include a first air flow device (e.g., a first vacuum source) configured to form the vacuum along the first vacuum passage to secure the particles to the first particle disc, and a second air flow device (e.g., a second vacuum source) configured to form the vacuum along the second vacuum passage to secure the particles to the second particle disc.

The particle belt 304 includes a base 370 and flights 372 coupled to and extending from the base 370. Each pair of opposing flights 372 of the particle belt 304 is configured to receive a respective particle 80 at the particle engagement section 348 of the particle belt 304 and to move the respective particle 80 to the particle exit section 352 of the particle belt 304.

As described above, the first particle disc 82 is configured to meter the particles 80 and to provide a spacing between the particles 80. The spacing between the particles 80 when disposed within the trench 31 may enhance plant development and/or yield. Additionally, the particle delivery system 300 is configured to accelerate the particles 80 generally toward and along the trench 31. The acceleration of the particles 80 by the particle delivery system 300 may enable the row unit to reduce a relative ground speed of the particles 80 compared to traditional row units that utilize seed tubes, which rely solely on gravity to accelerate the particles 80 for delivery to soil. For example, the particle delivery system 300 is configured to accelerate the particles 80 via the air flow system 320, gravity, the second particle disc 302, and the particle belt 304. The air flow system 320 is configured to provide the first air flow 112 from the second air tube 106 to accelerate the particles 80 downwardly along the release trajectory 114 (e.g., the air flow system 320 may apply a force to the particles 80 via the first air flow 112). Additionally, the particle delivery system 300 is configured to enable the particles 80 to accelerate under the influence of gravity as the particles 80 travel between the first particle disc 82 and the second particle disc 302.

The second particle disc 302 is configured to accelerate the particles 80 received from the first particle disc 82, such that a particle transfer speed of the particles 80 expelled from the second particle disc 302 along the transfer trajectory 350 toward the particle engagement section 348 of the particle belt 304 reaches a target particle transfer speed at the particle engagement section 348. The particle transfer speed of the particles 80 may reach the target particle transfer speed when the particle transfer speed is equal to the target particle transfer speed, when the particle transfer speed passes (e.g., is greater than or less than) the target particle transfer speed, when the particle transfer speed is within a threshold value of the target particle transfer speed, or a combination thereof. In certain embodiments, as described above, the air flow system may provide an air flow at the release point of the second particle disc and/or into the second particle tube to accelerate the particles toward the particle engagement section of the particle belt, such that the particle transfer speed reaches the target particle transfer speed.

The particle belt 304 is configured to accelerate the particles 80 received from the second particle disc 302, such that a particle exit speed of the particles 80 expelled from the particle belt 304 along the release trajectory 354 toward the trench 31 reaches a target particle exit speed. The particle exit speed of the particles 80 may reach the target particle exit speed when the particle exit speed is equal to the target particle exit speed, when the particle exit speed passes (e.g., is greater than or less than) the target particle exit speed, when the particle exit speed is within a threshold value of the target particle exit speed, or a combination thereof. In certain embodiments, the particle belt 304 is configured to rotate faster than the second particle disc 302 to accelerate the particles 80. For example, the particle belt 304 may rotate at a belt speed faster than a rotational speed of the second particle disc 302 (e.g., faster than a tangential speed of the apertures 360 of the second particle disc 302).

In some embodiments, the particle belt 304 may be a particle transfer belt (e.g., a particle transport belt) configured to transfer (e.g., transport) the particles 80 from the second particle disc 302 to the trench 31 without accelerating the particles 80. For example, the particle transfer speed of the particles 80 at the particle engagement section 348 may be generally equal to the particle exit speed of the particles 80 at the particle exit section 352. In certain embodiments, rotation of the particle belt 304 may be controlled, such that the particle exit speed is within a threshold value of the particle transfer speed (e.g., such that a difference between the particle transfer speed and the particle exit speed is less than the threshold value).

In some embodiments, the particle delivery system may include additional particle disc(s) (e.g., in addition to the second particle disc 302) and/or additional particle belt(s) (e.g., in addition to the particle belt 304) configured to accelerate the particles toward and/or along the trench. Each particle disc and/or particle belt may rotate progressively faster, such that each progressive particle disc and/or particle belt imparts a greater velocity on each particle as the particle is released from the respective particle disc and/or particle belt.

As illustrated, the first particle disc 82 has fourteen apertures 90. In certain embodiments, the first particle disc 82 may have more or fewer apertures 90 (e.g., one aperture 90, two apertures 90, three apertures 90, six apertures 90, twelve apertures 90, twenty-four apertures 90, etc.). Additionally, the second particle disc 302 has fourteen apertures 360. In certain embodiments, the second particle disc 302 may have more or fewer apertures 360 (e.g., one aperture 360, two apertures 360, three apertures 360, six apertures 360, twelve apertures 360, twenty-four apertures 360, etc.). In some embodiments, the second particle disc 302 may have fewer apertures 360 than the apertures 90 of the first particle disc 82. For example, the second particle disc 302 may include one aperture 360, two apertures 360, three apertures 360, or six apertures 360, while the first particle disc 302 may include eight apertures 90, ten apertures 90, twelve apertures 90, sixteen apertures 90, or twenty four apertures 90. As illustrated, the first particle disc 82 and the second particle disc 302 each have a generally similar radius. In certain embodiments, the radius of the second particle disc 302 may be smaller the radius of the first particle disc 82. For example, the radius of the second particle disc 302 may be two-thirds the radius of the first particle disc 82, one-half the radius of the first particle disc 82, one-third the radius of the first particle disc 82, one-fourth the radius of the first particle disc 82, etc. As such, the second particle disc 302 may have fewer apertures and a smaller radius compared to the first particle disc 82 and may rotate faster than the first particle disc 82 to progressively accelerate the particles 80 for deposition to the trench 31. In embodiments with additional particle disc(s) configured to accelerate the particles 80 (e.g., additional particle discs disposed generally between the particle disc 82 and the particle belt 304), each additional particle disc may be generally smaller, may have fewer apertures, and may rotate faster than the first particle disc 82. Each additional particle disc disposed closer to the trench 31 than a previous particle disc may be generally smaller, may have fewer apertures, and/or may rotate faster than the previous particle disc.

In certain embodiments, the particle delivery system may include the particle transfer assembly between the second particle disc and the particle belt. For example, the particle tube extending between the release point of the second particle disc and the particle engagement section of the particle belt may be included in the particle transfer assembly. In some embodiments, the particle transfer assembly may include the guide wheels configured to rotate to accelerate the particles flowing from the release point of the second particle disc to the particle engagement section of the particle belt (e.g., in place of or in addition to the particle tube).

The particle delivery system 300 includes the controller 170 configured to control the rotation rate (e.g., the rotational speed) of the first particle disc 82 to adjust/control the spacing between the particles 80. For example, as described above, the controller 170 may control the motor 171, which is configured to drive rotation of the first particle disc 82, to adjust/control the rotation rate of the first particle disc 82 (e.g., by outputting an output signal to the motor 171 indicative of instructions to adjust the rotation rate of the first particle disc 82). Additionally, as described above, the controller 170 may be configured to control the first air flow 112 provided by the air flow system 320 to adjust/control a particle transfer speed (e.g., a first particle transfer speed) of each particle 80 expelled from the first particle disc 82 (e.g., from the release point 96 of the first particle disc 82, along the release trajectory 114, and toward the engagement point 342 of the second particle disc 302), such that the particle transfer speed reaches the target particle transfer speed (e.g., a second target particle transfer speed) at the engagement point 342.

Additionally, the controller 170 is configured to control the rotation rate of the second particle disc 302 to adjust/control the particle transfer speed (e.g., a second particle transfer speed) of the particles 80 expelled from the release point 346 of the second particle disc 302, such that the particle transfer speed reaches a target particle transfer speed (e.g., a second target particle transfer speed) at the particle engagement section 348 of the particle belt 304. For example, the controller 170 may control a motor 380 configured to drive rotation of the second particle disc 302 to adjust/control the rotation rate of the second particle disc 302 (e.g., by outputting an output signal to the motor 380 indicative of instructions to adjust the rotation rate of the second particle disc 302), thereby enabling the controller 170 to adjust/control the particle transfer speed of the particles 80. The controller 170 may control the particle transfer speed of the particles 80, such that the particle transfer speed reaches the target particle transfer speed. The controller 170 may determine the target particle transfer speed of the particles 80 based on the type of the particles 80, an input received from a user interface, a belt speed of the particle belt 304, and/or the ground speed of the row unit. The target particle transfer speed may be any suitable speed, such one kilometer per hour (kph), two kph, three kph, five kph, ten kph, fifteen kph, twenty kph, etc. In certain embodiments, the controller 170 may determine the target particle transfer speed as a target percentage of the belt speed of the particle belt 304 and/or the ground speed of the row unit (e.g., thirty percent, fifty percent, seventy percent, eighty percent, ninety percent, ninety-five percent, one hundred percent, etc.).

To control the rotation rate of the second particle disc 302, the controller 170 may receive an input signal indicative of the particle transfer speed of the particle 80 at the particle engagement section 348 of the particle belt 304. For example, the controller 170 may receive the input signal from a particle sensor 382 of the particle delivery system 300 disposed adjacent to the particle engagement section 348 and along the transfer trajectory 350. The particle sensor 382 may be positioned a fixed distance from the particle engagement section 348, such that the controller 170 may determine the particle transfer speed of the particle 80 at the particle engagement section 348 based on the fixed distance and the input signal indicative of the particle transfer speed received from the particle sensor 180 (e.g., based on acceleration or deceleration of the particle 80 traveling the fixed distance).

The controller 170 may compare the particle transfer speed of the particle 80 at the particle engagement section 348 to the target particle transfer speed to determine whether a difference between the particle transfer speed and the target particle transfer speed exceeds a threshold value. In response to determining that the particle transfer speed at the particle engagement section 348 is less than the target particle transfer speed and the difference between the particle transfer speed and the target particle transfer speed exceeds the threshold value, the controller 170 may output an output signal indicative of instructions to increase the rotation rate of the second particle disc 302. For example, the controller 170 may output the output signal to the motor 380 to cause the motor 380 to increase the rotation rate of the second particle disc 302. The increase in the rotation rate of the second particle disc 302 may increase the particle transfer speed, such that the particle transfer speed reaches the target particle transfer speed (e.g., such that the difference between the particle transfer speed and the target particle transfer speed is less than the threshold value).

In response to determining that the particle transfer speed at the particle engagement section 348 is greater than the target particle transfer speed and the difference between the particle transfer speed and the target particle transfer speed exceeds the threshold value, the controller 170 may output an output signal indicative of instructions to decrease the rotation rate of the second particle disc 302. For example, the controller 170 may output the output signal to the motor 380 to cause the motor 380 to decrease the rotation rate of the second particle disc 302. The decrease in the rotation rate of the second particle disc 302 may decrease the particle transfer speed, such that the particle transfer speed reaches the target particle transfer speed (e.g., such that the difference between the particle transfer speed and the target particle transfer speed is less than the threshold value).

Furthermore, the controller 170 is configured to control the belt speed of the particle belt 304 to adjust/control the particle exit speed of the particles 80 expelled from the particle belt 304 (e.g., from the particle exit section 352 of the particle belt 304, along the release trajectory 354, and toward and/or along the trench 31), such that the particle exit speed reaches a target particle exit speed. For example, the controller 170 may control a wheel 384, via a motor 386, which is configured to drive rotation of the particle belt 304, to adjust/control the belt speed of the particle belt 304 (e.g., by outputting an output signal to the motor 386 indicative of instructions to adjust the belt speed of the particle belt 304), thereby enabling the controller 170 to adjust/control the particle exit speed of the particles 80. The controller 170 may control the particle exit speed of the particles 80, such that the particle exit speed reaches the target particle exit speed. The controller 170 may determine the target particle exit speed of the particles 80 based on the type of the particles 80, an input received from a user interface, and/or the ground speed of the row unit. The target particle exit speed may be any suitable speed, such one kilometer per hour (kph), two kph, three kph, five kph, ten kph, fifteen kph, twenty kph, etc. In certain embodiments, the controller 170 may determine the target particle exit speed as a target percentage of the ground speed of the row unit (e.g., thirty percent, fifty percent, seventy percent, eighty percent, ninety percent, ninety-five percent, one hundred percent, etc.).

To control the belt speed of the particle belt 304, the controller 170 may receive an input signal indicative of the particle exit speed of the particle 80 at the particle exit section 352 of the particle belt 304. For example, the controller 170 may receive the input signal from the particle sensor 176 of the particle delivery system 300 disposed adjacent to the particle exit section 352 and along the release trajectory 354. The particle sensor 176 may be positioned a fixed distance from the particle exit section 352, such that the controller 170 may determine the particle exit speed of the particle 80 at the particle exit section 352 based on the fixed distance and the input signal indicative of the particle exit speed received from the particle sensor 186 (e.g., based on acceleration or deceleration of the particle 80 traveling the fixed distance).

The controller 170 may compare the particle exit speed of the particle 80 at the particle exit section 352 to the target particle exit speed to determine whether a difference between the particle exit speed and the target particle exit speed exceeds a threshold value. In response to determining that the particle exit speed at the particle exit section 352 is less than the target particle exit speed and the difference between the particle exit speed and the target particle exit speed exceeds the threshold value, the controller 170 may output an output signal indicative of instructions to increase the belt speed of the particle belt 304. For example, the controller 170 may output the output signal to the motor 386 to cause the motor 386 to increase the belt speed of the particle belt 304. The increase in the belt speed of the particle belt 304 may increase the particle exit speed, such that the particle exit speed reaches the target particle exit speed (e.g., such that the difference between the particle exit speed and the target particle exit speed is less than the threshold value).

In response to determining that the particle exit speed at the particle exit section 352 of the particle belt 304 is greater than the target particle exit speed and the difference between the particle exit speed and the target particle exit speed exceeds the threshold value, the controller 170 may output an output signal indicative of instructions to decrease the belt speed of the particle belt 304. For example, the controller 170 may output the output signal to the motor 386 to cause the motor 386 to decrease the belt speed of the particle belt 304. The decrease in the belt speed of the particle belt 304 may decrease the particle exit speed, such that the particle exit speed reaches the target particle exit speed (e.g., such that the difference between the particle exit speed and the target particle exit speed is less than the threshold value).

Figure 9:
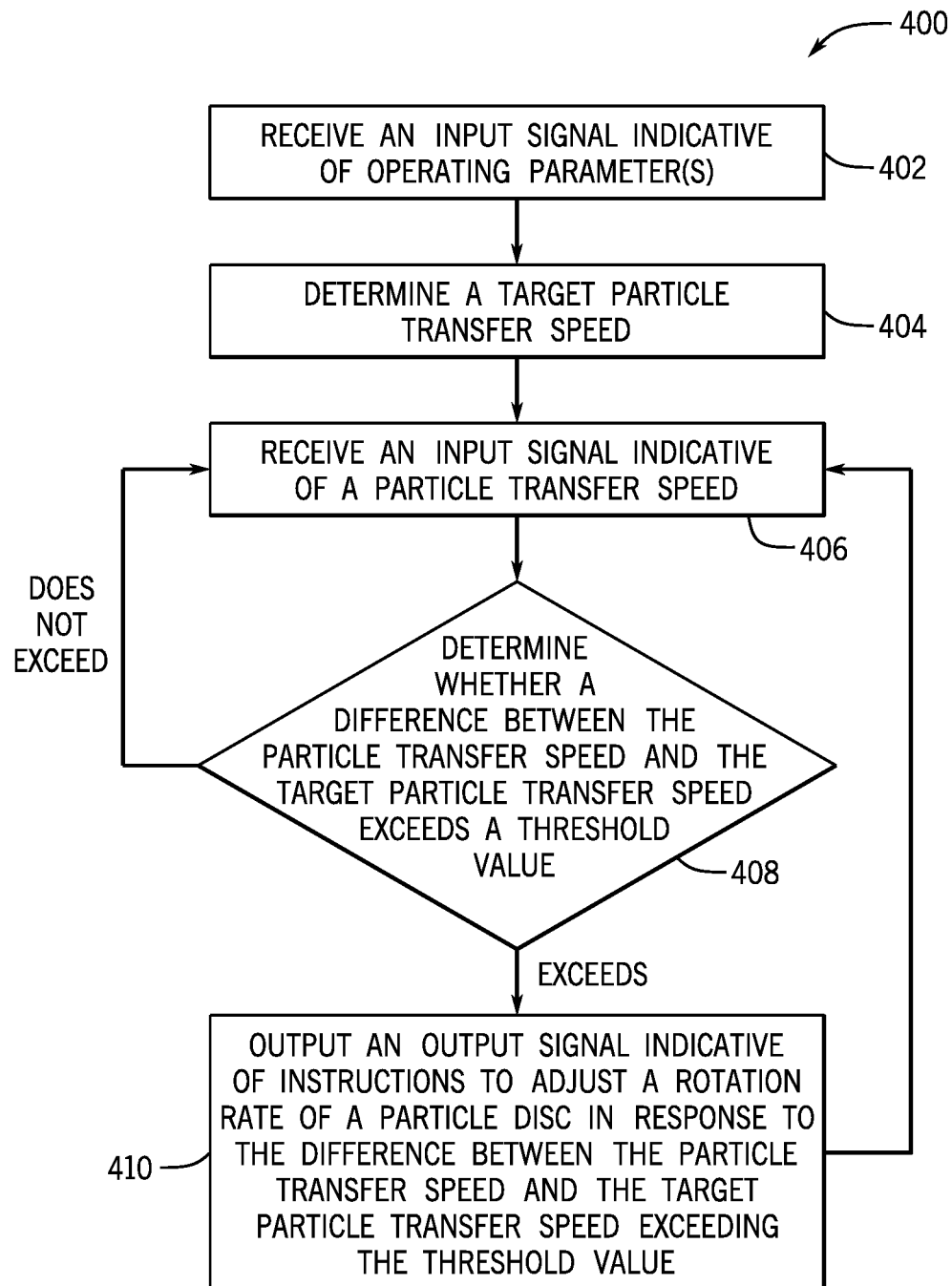
FIG. 9 is a flow diagram of an embodiment of a process for controlling a particle delivery system, in accordance with an aspect of the present disclosure.

FIG. 9 is a flow diagram of an embodiment of a process 400 for controlling the particle delivery system. The process 400, or portions thereof, may be performed by the controller of the particle delivery system. The process 400 begins at block 402, in which an input signal indicative of operating parameter(s) is received. For example, the operating parameters may include the type of the particles, the ground speed of the row unit, a radius of one or more particle discs, a spacing between apertures of one or more particle discs, a length of one or more particle belts, a spacing between flights of one or more particle belts, a distance between one or more particle discs and/or one or more particle belts, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 404, the target particle transfer speed (e.g., the second target particle transfer speed) is determined. For example, the controller may determine the target particle transfer speed of the particles based on the type of the particles, the belt speed of the particle belt, other operating parameter(s) received at block 402, or a combination thereof. At block 406, an input signal indicative of the particle transfer speed of the particle at the particle engagement section of the particle belt is received. For example, the controller may receive the input signal indicative of the particle transfer speed from the particle sensor disposed adjacent to the particle engagement section of the particle belt. In certain embodiments, the controller may receive multiple input signals from the particle sensor, in which each input signal is indicative of a particle transfer speed of a respective particle. The controller may determine an average of the multiple particle transfer speeds to determine the average particle transfer speed of the particles at the particle engagement section. As such, the controller may account for variance among the particle transfer speeds of multiple particles at the particle engagement section to reduce excessive control actions (e.g., adjustments to the rotation rate of the second particle disc).

At block 408, a determination of whether a difference between the particle transfer speed and the target particle transfer speed exceeds a threshold value is made (e.g., by the controller). Additionally, a determination of whether the particle transfer speed is less than or greater than the target particle transfer speed is made (e.g., by the controller). The threshold value may be determined based on the type of the particles and/or the belt speed of the particle belt. In response to the difference exceeding the threshold, the process 400 proceeds to block 410. In response to the difference not exceeding the threshold, the process 400 returns to block 406 and receives the next input signal indicative of the particle transfer speed.

At block 410, in response to the difference between the particle transfer speed and the target particle transfer speed exceeding the threshold value, an output signal indicative of instructions to adjust the rotation rate of the second particle disc is output to the motor coupled to and configured to drive rotation of the second particle disc. For example, the controller may output the output signal indicative of instructions to increase the rotation rate of the second particle disc based on a determination that the particle transfer speed is less than the target particle transfer speed and the difference between the particle transfer speed and the target particle transfer speed exceeds the threshold value. Further, the controller may output the output signal indicative of instructions to decrease the rotation rate of the second particle disc based on a determination that the particle transfer speed is greater than the target particle transfer speed and the difference between the particle transfer speed and the target particle transfer speed exceeds the threshold value.

After completing block 410, the process 400 returns to block 406 and receives the next input signal indicative of the particle transfer speed of the particle at the particle engagement section of the particle belt. The next determination is made of whether the difference between the particle transfer speed and the target particle transfer speed exceeds the threshold value (e.g., block 408), and the rotation rate of the second particle disc is adjusted in response to the determination. As such, blocks 406-410 of the process 280 may be iteratively performed (e.g., by the controller of the particle delivery system and/or by another suitable controller) to facilitate acceleration of the particles to the target particle transfer speed and transfer of the particles between the second particle disc and the particle belt. In some embodiments, certain blocks of the blocks 282-290 may be omitted from the process 280, and/or the order of the blocks 282-290 may be different.

Figure 10:
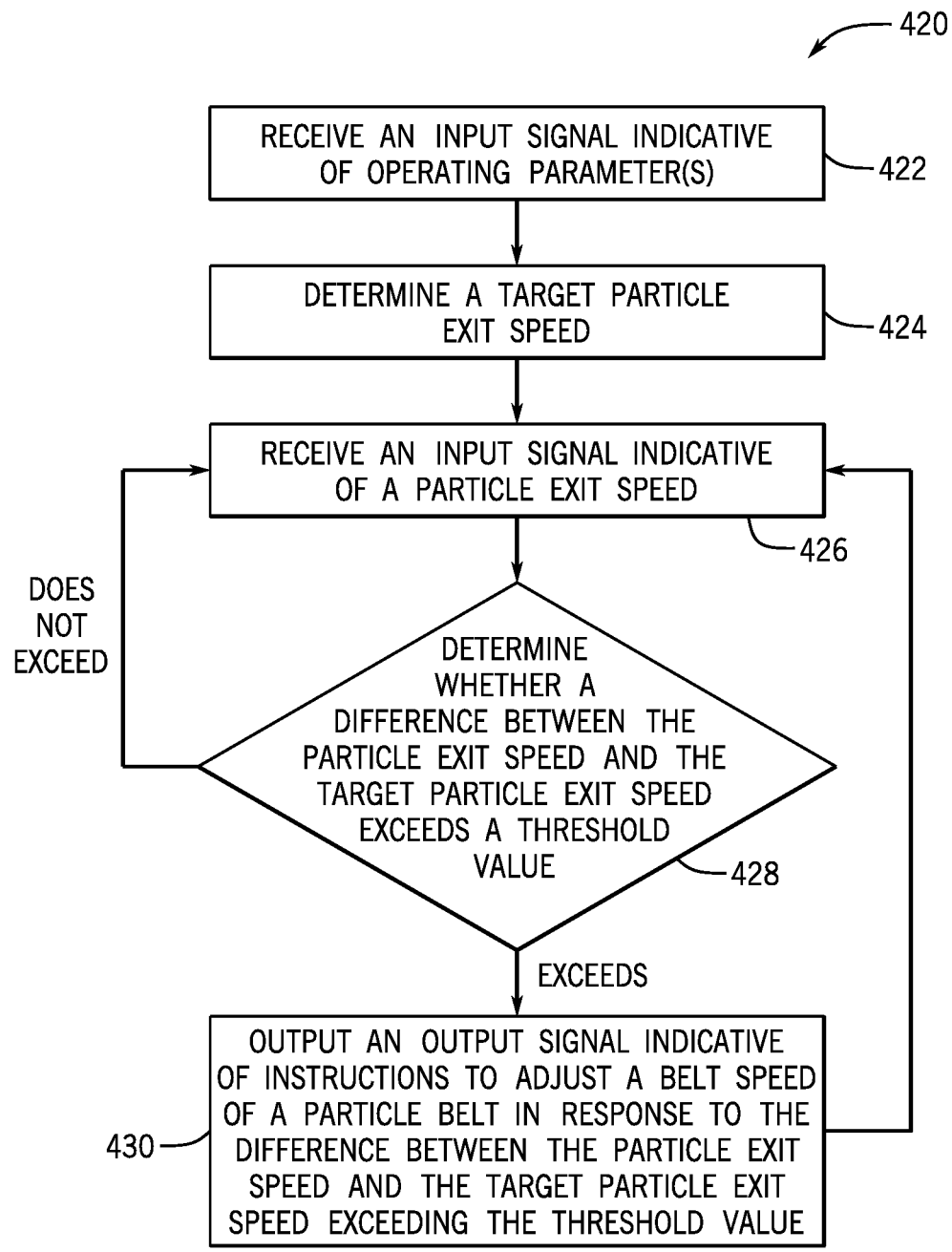
FIG. 10 is a flow diagram of an embodiment of a process for controlling a particle delivery system, in accordance with an aspect of the present disclosure.

FIG. 10 is a flow diagram of an embodiment of a process 420 for controlling the particle delivery system. The process 420, or portions thereof, may be performed by the controller of the particle delivery system. The process 420 begins at block 422, in which an input signal indicative of operating parameter(s) is received. For example, the operating parameters may include the type of the particles, the ground speed of the row unit, a radius of one or more particle discs, a spacing between apertures of one or more particle discs, a length of one or more particle belts, a spacing between flights of one or more particle belts, a distance between one or more particle discs and/or one or more particle belts, or a combination thereof. The input signal may be received from the user interface communicatively coupled to the controller, may be stored in the memory of the controller, may be received via sensor(s) of the row unit and/or the agricultural implement, may be received from a transceiver, or a combination thereof.

At block 424, the target particle exit speed is determined. For example, the controller may determine the target particle exit speed of the particles based on the type of the particles, the ground speed of the row unit, other operating parameter(s) received at block 422, or a combination thereof. At block 426, an input signal indicative of the particle exit speed of the particle at the particle exit section of the particle belt is received. For example, the controller may receive the input signal indicative of the particle exit speed from the particle sensor disposed adjacent to the particle exit section of the particle belt. In certain embodiments, the controller may receive multiple input signals from the particle sensor, in which each input signal is indicative of a particle exit speed of a respective particle. The controller may determine an average of the multiple particle exit speeds to determine the average particle exit speed of the particles at the particle exit section. As such, the controller may account for variance among the particle exit speeds of multiple particles at the release point to reduce excessive control actions (e.g., adjustments to the belt speed of the particle belt).

At block 428, a determination of whether a difference between the particle exit speed and the target particle exit speed exceeds a threshold value is made (e.g., by the controller). Additionally, a determination of whether the particle exit speed is less than or greater than the target particle exit speed is made (e.g., by the controller). The threshold value may be determined based on the type of the particles, the ground speed of the row unit, and/or other factors. In response to the difference exceeding the threshold, the process 420 proceeds to block 430. In response to the difference not exceeding the threshold, the process 420 returns to block 426 and receives the next input signal indicative of the particle exit speed.

At block 430, in response to the difference between the particle exit speed and the target particle exit speed exceeding the threshold value, an output signal indicative of instructions to adjust the belt speed of the particle belt is output to the motor coupled to the wheel configured to drive rotation of the particle belt. For example, the controller may output the output signal indicative of instructions to increase the belt speed of the particle belt based on a determination that the particle exit speed is less than the target particle exit speed and the difference between the particle exit speed and the target particle exit speed exceeds the threshold value. Further, the controller may output the output signal indicative of instructions to decrease the belt speed of the particle belt based on a determination that the particle exit speed is greater than the target particle exit speed and the difference between the particle exit speed and the target particle exit speed exceeds the threshold value.

After completing block 430, the process 420 returns to block 426 and receives the next input signal indicative of the particle exit speed of the particle at the particle exit section of the particle belt. The next determination is made of whether the difference between the particle exit speed and the target particle exit speed exceeds the threshold value (e.g., block 428), and the belt speed of the particle belt is adjusted in response to the determination. As such, blocks 426-430 of the process 420 may be iteratively performed (e.g., by the controller of the particle delivery system and/or by another suitable controller) to facilitate acceleration of the particles to the target particle exit speed. In some embodiments, certain blocks of the blocks 422-430 may be omitted from the process 420, and/or the order of the blocks 422-430 may be different.

Embodiments of a particle delivery system described herein may facilitate deposition of particles into a trench in soil. The particle delivery system may be configured to accelerate the particles downwardly toward and along the trench and to provide particular spacings between the particles along the trench. For example, the particle delivery system may include a first particle disc configured to meter individual particles, thereby establishing a particular spacing between particles. The first particle disc may be configured to release the particles from a release point of the first particle disc. A second particle disc may be configured to receive the particles from the first particle disc at an engagement point of the second particle disc. The second particle disc may be configured to transport the particles from the engagement point toward a release point of the second particle disc. At the release point of the second particle disc, the second particle disc may be configured to deliver and/or propel the particles into the trench in the soil. For example, the second particle disc may accelerate the particles to a speed greater than a speed resulting from gravitational acceleration alone. Additionally, the second particle disc may accelerate the particles such that the particle delivery system reduces the relative ground speed of the particles. As such, the second particle disc may enable the row unit to travel faster than traditional row units that utilize seed tubes, which rely on gravity to accelerate the particles (e.g., seeds) for delivery to soil. For example, the particle delivery system may achieve higher application rates of the particles compared to traditional row units, thereby enabling the row unit having the particle delivery system to travel faster than traditional row units.

In certain embodiments, the particle delivery system may include a particle belt in addition to the first particle disc and the second particle disc. For example, the particle belt may be configured to receive the particles from the second particle disc at a particle engagement section of the particle belt. The particle belt may be configured to transport the particles from the particle engagement section toward a particle exit section of the particle belt. At the particle exit section, the particle belt may be configured to deliver and/or propel the particles into the trench in the soil. For example, the particle belt may accelerate the particles to a speed greater than a speed resulting from gravitational acceleration alone. Additionally, the particle belt may accelerate the particles such that the particle delivery system reduces the relative ground speed of the particles. Further, the particle belt may rotate faster than the second particle disc, such that the second particle disc and the particle belt progressively accelerate the particles. As such, the particle belt may enable the row unit to travel faster than traditional row units that utilize seed tubes, which rely on gravity to accelerate the particles (e.g., seeds) for delivery to soil. For example, the particle delivery system may achieve higher application rates of the particles compared to traditional row units, thereby enabling the row unit having the particle delivery system to travel faster than traditional row units.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A particle delivery system of an agricultural row unit, comprising:
   a first particle disc configured to meter a plurality of particles from a particle storage area, wherein the first particle disc comprises one or more first apertures;
   a second particle disc configured to receive each particle of the plurality of particles from the first particle disc and to transfer the particle toward a trench in soil, wherein the second particle disc comprises one or more second apertures; and
   at least one vacuum source in fluid communication with a first vacuum passage positioned adjacent to the first particle disc and with a second vacuum passage positioned adjacent to the second particle disc, wherein the at least one vacuum source is configured to reduce air pressure within the first vacuum passage to couple a particle of the plurality of particles to a first respective aperture of the one or more first apertures while the first respective aperture is aligned with the first vacuum passage, the at least one vacuum source is configured to reduce air pressure within the second vacuum passage to couple the particle to a second respective aperture of the one or more second apertures while the second respective aperture is aligned within the second vacuum passage, a rotation rate of the first particle disc is controllable to establish a particle spacing between the plurality of particles within the trench, and a rotation rate of the second particle disc is controllable to expel each particle of the plurality of particles at a particle exit speed.

2. The particle delivery system of claim 1, comprising a controller having a memory and a processor, a first motor configured to drive the first particle disc to rotate, and a second motor configured to drive the second particle disc to rotate, wherein the controller is communicatively coupled to the first motor and the second motor, the controller is configured to control the rotation rate of the first particle disc by outputting a first output signal to the first motor, and the controller is configured to control the rotation rate of the second particle disc by outputting a second output signal to the second motor.

3. The particle delivery system of claim 2, wherein the controller is configured to determine a target particle exit speed based on a type of the plurality of particles, a ground speed of the agricultural row unit, or both.

4. The particle delivery system of claim 3, wherein the controller is configured to receive an input signal indicative of the particle exit speed of one particle of the plurality of particles and to output the second output signal indicative of instructions to adjust the rotation rate of the second particle disc based on the particle exit speed.

5. The particle delivery system of claim 4, wherein the controller is configured to:
   output the second output signal indicative of instructions to increase the rotation rate of the second particle disc in response to determining that the particle exit speed is less than the target particle exit speed and a difference between the particle exit speed and the target particle exit speed exceeds a threshold value; and
   output the second output signal indicative of instructions to decrease the rotation rate of the second particle disc in response to determining that the particle exit speed is greater than the target particle exit speed and the difference between the particle exit speed and the target particle exit speed exceeds the threshold value.

6. The particle delivery system of claim 1, comprising a particle transfer assembly disposed generally between the first particle disc and the second particle disc, wherein the particle transfer assembly is configured to facilitate transferring the plurality of particles to the second particle disc.

7. The particle delivery system of claim 6, wherein the particle transfer assembly comprises a particle tube extending between the first particle disc and the second particle disc and configured to guide the plurality of particles from the first particle disc to the second particle disc.

8. The particle delivery system of claim 7, comprising an air flow device configured to output an air flow into the particle tube to direct the plurality of particles from the first particle disc and into the particle tube.

9. The particle delivery system of claim 6, wherein the particle transfer assembly comprises at least one guide wheel configured to rotate to accelerate the plurality of particles toward the second particle disc.

10. The particle delivery system of claim 1, comprising an air flow device configured to output an air flow to accelerate the plurality of particles from the first particle disc toward the second particle disc.

11. The particle delivery system of claim 1, comprising a first disc housing, wherein the first particle disc is disposed and configured to rotate within the first disc housing, and the particle storage area is formed within the first disc housing.

12. A particle delivery system of an agricultural row unit, comprising:
   a first particle disc configured to meter a plurality of particles from a particle storage area, wherein the first particle disc comprises one or more first apertures;
   a second particle disc configured to receive each particle of the plurality of particles from the first particle disc and to transfer the particle toward a trench in soil, wherein the second particle disc comprises one or more second apertures;
   at least one vacuum source configured to reduce air pressure adjacent to the first particle disc to couple a particle of the plurality of particles to a first respective aperture of the one or more first apertures and to reduce air pressure adjacent to second particle disc to couple the particle to a second respective aperture of the one or more second apertures; and a particle transfer assembly disposed generally between the first particle disc and the second particle disc, wherein the particle transfer assembly is configured to facilitate transferring the plurality of particles to the second particle disc, the first particle disc is configured to establish a particle spacing between the plurality of particles based on a rotation rate of the first particle disc, and the second particle disc is configured to expel the plurality of particles at a particle exit speed based on a rotation rate of the second particle disc.

13. The particle delivery system of claim 12, wherein the particle transfer assembly comprises at least one guide wheel configured to rotate to accelerate the plurality of particles toward the second particle disc.

14. The particle delivery system of claim 13, comprising a controller having a memory and a processor, and a motor configured to drive the at least one guide wheel to rotate, wherein the controller is communicatively coupled to the motor, and the controller is configured to control the rotation rate of the at least one guide wheel by outputting an output signal to the motor.

15. The particle delivery system of claim 14, wherein the controller is configured to receive an input signal indicative of a particle transfer speed of one particle of the plurality of particles at the second particle disc and to output the output signal indicative of instructions to adjust the rotation rate of the at least one guide wheel of the particle transfer assembly based on the particle transfer speed, such that the particle transfer speed reaches a target particle transfer speed.

16. The particle delivery system of claim 15, wherein the controller is configured to:

output the output signal indicative of instructions to increase the rotation rate of the at least one guide wheel in response to determining that the particle transfer speed is less than the target particle transfer speed and a difference between the particle transfer speed and the target particle transfer speed exceeds a threshold value; and output the output signal indicative of instructions to decrease the rotation rate of the at least one guide wheel in response to determining that the particle transfer speed is greater than the target particle transfer speed and the difference between the particle transfer speed and the target particle transfer speed exceeds the threshold value.

17. A particle delivery system of an agricultural row unit, comprising:

a first particle disc configured to meter a plurality of particles from a particle storage area, wherein the first particle disc comprises one or more first apertures;

a second particle disc configured to receive each particle of the plurality of particles from the first particle disc and to transfer the particle toward a trench in soil, wherein the second particle disc comprises one or more second apertures;

at least one vacuum source in fluid communication with a first vacuum passage positioned adjacent to the first particle disc and with a second vacuum passage positioned adjacent to the second particle disc, wherein the at least one vacuum source is configured to reduce air pressure within the first vacuum passage to couple a particle of the plurality of particles to a first respective aperture of the one or more first apertures while the first respective aperture is aligned with the first vacuum passage, the at least one vacuum source is configured to reduce air pressure within the second vacuum passage to couple the particle to a second respective aperture of the one or more second apertures while the second respective aperture is aligned within the second vacuum passage, a rotation rate of the first particle disc is controllable to establish a particle spacing between the plurality of particles within the trench, and a rotation rate of the second particle disc is controllable to expel each particle of the plurality of particles at a particle exit speed;

a particle transfer assembly disposed generally between the first particle disc and the second particle disc, wherein the particle transfer assembly is configured to facilitate transferring the plurality of particles to the second particle disc;

a first motor configured to drive the first particle disc to rotate;

a second motor configured to drive the second particle disc to rotate; and a controller comprising a memory and a processor, wherein the controller is communicatively coupled to the first motor and the second motor, and the controller is configured to control the rotation rate of the first particle disc by outputting a first output signal to the first motor, and the controller is configured to control the rotation rate of the second particle disc by outputting a second output signal to the second motor.

18. The particle delivery system of claim 17, wherein the controller is configured to determine a target particle exit speed based on a type of the plurality of particles, as a target percentage of a ground speed of the agricultural row unit, or both.

19. The particle delivery system of claim 18, wherein the controller is configured to receive an input signal indicative of the particle exit speed of one or more particle of the plurality of particles and to output the second output signal indicative of instructions to adjust the rotation rate of the second particle disc based on the particle exit speed, such that the particle exit speed reaches the target particle exit speed.

20. The particle delivery system of claim 17, wherein the particle transfer assembly comprises a particle tube extending between the first particle disc and the second particle disc and configured to guide the plurality of particles from the first particle disc to the second particle disc.

* * * * *